US010558725B2

(12) United States Patent
Maquaire et al.

(10) Patent No.: US 10,558,725 B2
(45) Date of Patent: Feb. 11, 2020

(54) SYSTEMS AND METHODS FOR PROVIDING FRACTAL MAP FOR WEB DISCOVERY AND NAVIGATION

(71) Applicant: Kloop Inc., San Francisco, CA (US)

(72) Inventors: Nicolas Maquaire, San Francisco, CA (US); Raphael Jean Leconte, Paris (FR)

(73) Assignee: KLOOP INC., San Francisco, CA (US)

( * ) Notice: Subject to any disclaimer, the term of this patent is extended or adjusted under 35 U.S.C. 154(b) by 99 days.

(21) Appl. No.: 15/956,042

(22) Filed: Apr. 18, 2018

(65) Prior Publication Data
US 2018/0300419 A1 Oct. 18, 2018

Related U.S. Application Data

(60) Provisional application No. 62/486,824, filed on Apr. 18, 2017.

(51) Int. Cl.
| | | |
|---|---|---|
| *G06F 17/00* | (2019.01) | |
| *G06F 16/954* | (2019.01) | |
| *G06F 3/0482* | (2013.01) | |
| *G06F 16/958* | (2019.01) | |
| *G06F 16/957* | (2019.01) | |
| *G06F 3/0483* | (2013.01) | |

(52) U.S. Cl.
CPC .......... *G06F 16/954* (2019.01); *G06F 3/0482* (2013.01); *G06F 3/0483* (2013.01); *G06F 16/958* (2019.01); *G06F 16/9577* (2019.01)

(58) Field of Classification Search
CPC ..................................................... G06F 16/904
See application file for complete search history.

(56) References Cited

U.S. PATENT DOCUMENTS

| | | | | |
|---|---|---|---|---|
| 2003/0050906 | A1* | 3/2003 | Clifton-Bligh | G06F 17/2235 |
| 2003/0080990 | A1* | 5/2003 | Lyness | G06F 3/0482 |
| | | | | 715/713 |
| 2009/0019348 | A1* | 1/2009 | King | G06F 3/0482 |
| | | | | 715/205 |
| 2009/0063389 | A1* | 3/2009 | Crawford | G06N 7/00 |
| | | | | 706/52 |
| 2014/0282118 | A1* | 9/2014 | Kumamoto | G06F 16/95 |
| | | | | 715/760 |

* cited by examiner

*Primary Examiner* — Andrew T McIntosh
(74) *Attorney, Agent, or Firm* — Van Court & Aldridge LLP

(57) ABSTRACT

Fractal maps are used to help with web discovery and navigation. The fractal map is generated during the exploration of the web (or any content repositories). The exploration can start from a particular article. The map can show a fixed number of related articles. Each representation of a related article has two distinct areas: one provides contextual information of the article itself and the second area can include progressively smaller scales that represent user's navigation through the related articles. Color codes can be used to indicate the strength of the relationship between articles, user actions, or ratings.

15 Claims, 21 Drawing Sheets

FIG. 7F

SYSTEMS AND METHODS FOR PROVIDING FRACTAL MAP FOR WEB DISCOVERY AND NAVIGATION

CROSS-REFERENCE TO A RELATED APPLICATION

This application claims priority to U.S. Provisional Application No. 62/486,824, filed Apr. 18, 2017, the disclosure of which is incorporated by reference in its entirety.

TECHNICAL FIELD

The present disclosure relates generally to the electrical, electronic and computer arts, and in particular, to web discovery and navigation.

BACKGROUND

When a user reads an article on a webpage, he or she may desire to know more on the topic or to get more context on the article. The user can search or browse the web or access similar articles. Typically, the user follows links from one article to another. However, the navigation of the links may be haphazard and typically draws the user away from the subject of interest. A need therefore exists for helping the user methodologically explore a universe of related articles.

SUMMARY

The present disclosure relates generally to use fractal maps to assist with web discovery and navigation. The fractal map is generated during the exploration of the web (or any content repositories). The exploration can start from a particular article. The fractal map can show a fixed number of related articles. Each representation of a related article has two distinct areas: one provides contextual information of the article itself and the second area can include progressively smaller scales that represent user's navigation through the related articles. Color codes can be used to indicate the strength of the relationship between articles, user actions, or ratings.

BRIEF DESCRIPTION OF THE DRAWINGS

The present disclosure will be understood more fully from the detailed description that follows and from the accompanying drawings, which however, should not be taken to limit the disclosed subject matter to the specific embodiments shown, but are for explanation and understanding only.

FIGS. 7A-7J show an illustrative user interface flow that uses fractal map navigation according to an embodiment;

DETAILED DESCRIPTION

Systems, methods, and computer readable media for providing fractal maps for web discovery and navigation are provided and described with reference to FIGS. 1-11.

An article is defined herein as a piece of writing that is accessible via the Internet and is presented for display on a user device such as a computer, laptop, tablet, or phone.

Figure 1:
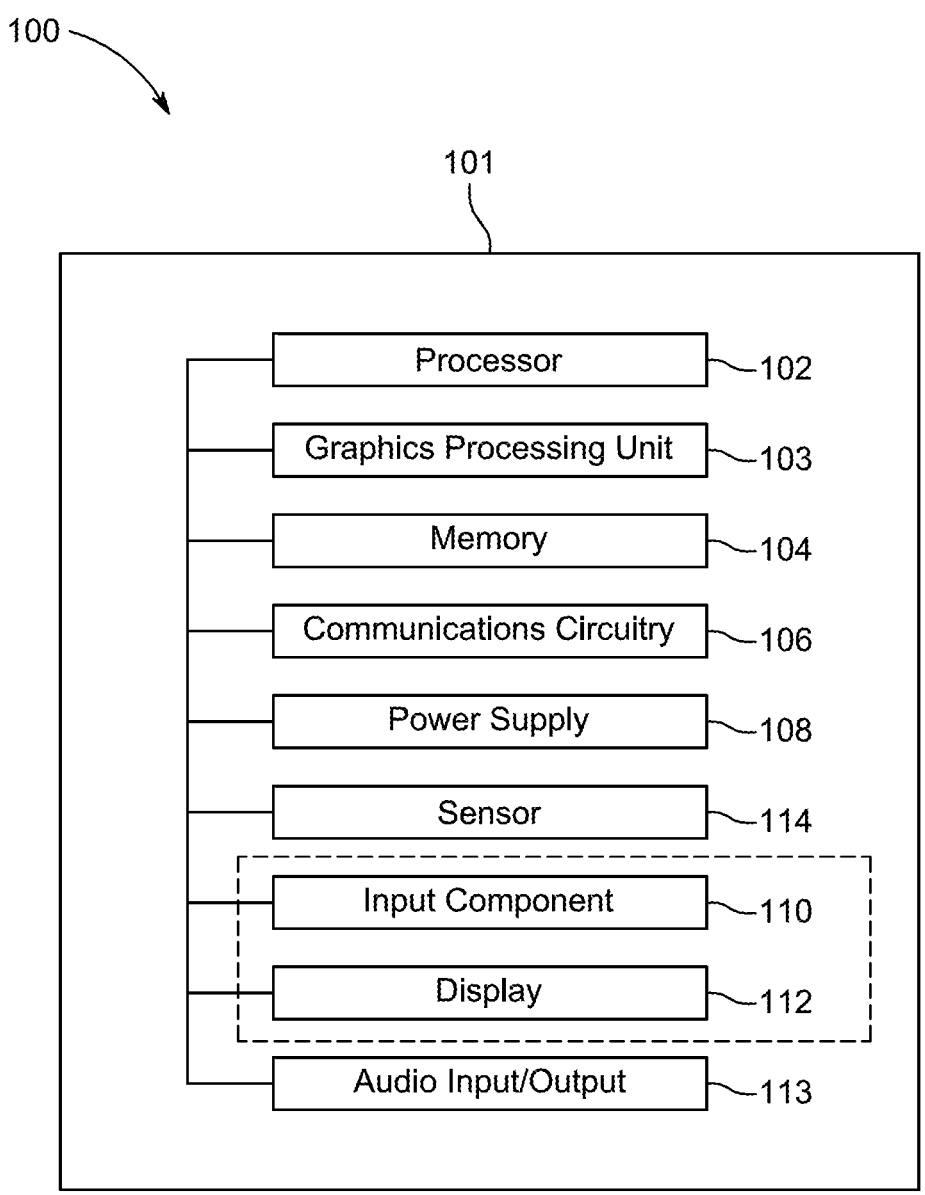
FIG. 1 is a schematic view of an illustrative electronic device according to an embodiment.

FIG. 1 is a schematic view of an illustrative electronic device 100. Electronic device 100 may be any portable, mobile, or hand-held electronic device that can operate wherever the user travels. Alternatively, electronic device 100 may not be portable at all, but may instead be generally stationary. Electronic device 100 can include, but is not limited to, a music player, video player, still image player, game player, other media player, music recorder, movie or video camera or recorder, still camera, other media recorder, radio, medical equipment, domestic appliance, transportation vehicle instrument, musical instrument, calculator, cellular telephone, smart phone, other wireless communication device, personal digital assistant, remote control, pager, computer (e.g., a desktop, laptop, tablet, server, etc.), monitor, television, stereo equipment, set up box, set-top box, boom box, modem, router, printer, and combinations thereof. In some embodiments, electronic device 100 may perform a single function (e.g., a device dedicated to presented asset content rendered at the datacenter and for processing inputs to control aspects of the asset content presented on the device) and, in other embodiments, electronic device 100 may perform multiple functions (e.g., a device that locally renders asset content for presentation, plays music, and receives and transmits telephone calls).

Electronic device 100 may include a processor or control circuitry 102, graphics processing unit 103, memory 104, communications circuitry 106, power supply 108, input component 110, display 112, audio input/output 113, and sensor 114. Electronic device 100 may also include a bus 116 that may provide one or more wired or wireless communications links or paths for transferring data and/or power to, from, or between various other components of electronic device 100. In some embodiments, one or more components of electronic device 100 may be combined or omitted. Moreover, electronic device 100 may include other components not combined or included in FIG. 1 and/or several instances of the components shown in FIG. 1. For the sake of simplicity, only one of each of the components of electronic device 100 is shown in FIG. 1.

Memory 104 of electronic device 100 may include one or more storage mediums, including for example, a hard-drive, flash memory, permanent memory such as read-only memory ("ROM"), semi-permanent memory such as random access memory ("RAM"), any other suitable type of storage component, or any combination thereof. Memory 104 may include cache memory, which may be one or more different types of memory used for temporarily storing data for electronic device applications. Memory 104 may store media data (e.g., music and image files), software (e.g., for implementing functions on electronic device 100), firmware, preference information (e.g., media playback preferences), transaction information (e.g., information such as credit card information), wireless connection information (e.g., information that may electronic device 100 to establish a wireless connection), subscription information (e.g., information that keeps track of gaming services or other media a user subscribes to), contact information (e.g., telephone numbers and e-mail addresses), calendar information, any other suitable data, or any combination thereof.

Communications circuitry 106 of electronic device 100 may be provided to allow electronic device 100 to communicate with one or more other electronic devices, datacenters, or servers using any suitable communications protocol. For example, communications circuitry 106 may support Wi-Fi (e.g., an 802.11 protocol), Ethernet, Bluetooth™, Bluetooth™ Low Energy ("BLE"), high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), hypertext transfer protocol ("HTTP"), BitTorrent™, file transfer protocol ("FTP"), real-time transport protocol ("RTP"), real-time streaming protocol ("RTSP"), secure shell protocol ("SSH"), any communications protocol that may be used by wireless and cellular telephones and personal e-mail devices (e.g., Global System for Mobile Communications ("GSM"), GSM plus Enhanced Data rates for GSM Evolution ("EDGE"), Code Division Multiple Access ("CDMA"), Orthogonal Frequency-Division Multiple Access ("OFDMA"), high speed packet access ("HSPA"), multi-band, etc.), any other communications protocol, or any combination thereof. Communications circuitry 106 may also include circuitry that can enable electronic device 100 to be electrically coupled to another device (e.g., a game controller or an accessory device) and communicate with that other device, either wirelessly or via a wired connection.

Power supply 108 of electronic device 100 may provide power to one or more of the components of electronic device 100. In some embodiments, power supply 108 can be coupled to a power grid (e.g., when device 100 is not a portable device, such as a desktop computer). In some embodiments, power supply 108 can include one or more batteries for providing power (e.g., when device 100 is a portable device, such as a smartphone). As another example, power supply 108 can be configured to generate power from a natural source (e.g., solar power using solar cells).

One or more input components 110 of electronic device 100 may be provided to permit a user to interact or interface with first electronic device 100. For example, input component 110 can take a variety of forms, including, but not limited to, a touch pad, dial, control pad, touch screen, one or more buttons (e.g., a keyboard), mouse, joy stick, track ball, microphone, camera, proximity sensor, light detector, and combinations thereof. Each input component 110 can be configured to provide one or more dedicated control functions for making selections or issuing commands associated with operating electronic device 100.

Electronic device 100 may also include one or more output components that may present information (e.g., graphical, audible, and/or tactile information) to a user of first electronic device 100. An output component of electronic device 100 may take various forms, including, but not limited to, audio speakers, headphones, audio line-outs, visual displays, antennas, infrared ports, rumblers, vibrators, or combinations thereof.

For example, as shown in FIG. 1, electronic device 100 may include display 112 as an output component. Display 112 may include any suitable type of display or interface for presenting visual data to a user. In some embodiments, display 112 may include a display embedded in electronic device 100 or coupled to electronic device 100 (e.g., a removable display). Display 112 may include, for example, a liquid crystal display ("LCD"), a light emitting diode ("LED") display, an organic light-emitting diode ("OLED") display, a surface-conduction electron-emitter display ("SED"), a carbon nanotube display, a nanocrystal display, any other suitable type of display, or combination thereof. Alternatively, display 112 can include a movable display or a projecting system for providing a display of content on a surface remote from first electronic device 100, such as, for example, a video projector, a head-up display, or a three-dimensional (e.g., holographic) display. As another example, display 112 may include a digital or mechanical viewfinder, such as a viewfinder of the type found in compact digital cameras, reflex cameras, or any other suitable still or video camera.

In some embodiments, display 112 may include display driver circuitry, circuitry for driving display drivers, or both. Display 112 can be operative to display content (e.g., asset content, application screens for applications implemented on first electronic device, information regarding ongoing communications operations, information regarding incoming communications requests, device operation screens, etc.) that may be under the direction of processor 102. Display 112 can be associated with any suitable characteristic dimensions defining the size and shape of the display. For example, the display can be rectangular or have any other polygonal shape, or alternatively can be defined by a curved or other non-polygonal shape (e.g., a circular display). Display 112 can have one or more primary orientations for which an interface can be displayed, or can instead or in addition be operative to display an interface along any orientation selected by a user.

It should be noted that one or more input components and one or more output components may sometimes be referred to collectively herein as an input/output ("I/O") component or I/O interface (e.g., input component 110, display 112, audio input/output 113 as I/O component or I/O interface 111). For example, input component 110 and display 112 may sometimes be a single I/O component 111, such as a touch screen, that may receive input information through a user's touch of a display screen and that may also provide visual information to a user via that same display screen.

Audio input/output 113 of electronic device 100 may include any suitable audio codec to outputting audio signals to a speaker and for receiving audio signals from a microphone. In some embodiments, audio 113 may only output audio signals, and in other embodiments, it may only receive audio signals.

Sensor 114 of electronic device 100 may include any suitable motion sensor operative to detect movements of first electronic device 100. For example, sensor 114 may be a motion-sensing component operative to detect movement of first electronic device 100. In some embodiments, sensor 114 may include one or more three-axis acceleration motion sensors (e.g., an accelerometer) operative to detect linear acceleration in three directions (i.e., the x- or left/right direction, the y- or up/down direction, and the z- or forward/backward direction). As another example, sensor 114 may include one or more single-axis or two-axis acceleration motion sensors which may be operative to detect linear acceleration only along each of the x- or left/right direction and the y- or up/down direction, or along any other pair of directions. In some embodiments, sensor 114 may include an electrostatic capacitance (e.g., capacitance-coupling) accelerometer that is based on silicon micro-machined micro electro-mechanical systems ("MEMS") technology, including a heat-based MEMS type accelerometer, a piezoelectric type accelerometer, a piezo-resistance type accelerometer, or any other suitable accelerometer.

In some embodiments, sensor 114 may be operative to directly or indirectly detect rotation, rotational movement, angular displacement, tilt, position, orientation, motion along a non-linear (e.g., arcuate) path, or any other non-linear motions. In some embodiments, sensor 114 may alternatively or additionally include one or more gyro-motion sensors or gyroscopes for detecting rotational movement. For example, sensor 114 may include a rotating or vibrating element. Using sensor 114, first electronic device 100 can determine an orientation of display 112, for example.

Processor 102 of electronic device 100 may include any processing circuitry operative to control the operations and performance of one or more components of first electronic device 100. For example, processor 102 may receive input signals from input component 110 and/or drive output signals through display 112. In some embodiments, as shown in FIG. 1, processor 102 may be used to run software 117. Software 117 may include, but is not limited to, an operating system, one or more operating system applications, firmware applications, media playback applications, media editing applications, or any other suitable applications. For example, processor 102 may load software 117 as a user interface program to determine how instructions or data received via an input component 110 or other component of device 100 may manipulate the way in which information is stored and/or provided to the user via an output component (e.g., display 112). Software 117 may be accessed by processor 102 from any suitable source, such as from memory 104 (e.g., via bus 116), or from any other suitable source. Electronic device 100 (e.g., processor 102, memory 104, or any other components available to device 100) may be configured to process graphical data at various resolutions, frequencies, intensities, and various other characteristics as may be appropriate for the capabilities and resources of first electronic device 100.

Electronic device 100 may also be provided with a housing 101 that may at least partially enclose one or more of the components of first electronic device 100 for protection from debris and other degrading forces external to device 100. In some embodiments, one or more of the components of first electronic device 100 may be provided within its own housing (e.g., input component 110 may be an independent keyboard or mouse within its own housing that may wirelessly or through a wire communicate with processor 102, which may be provided within its own housing).

Figure 2:
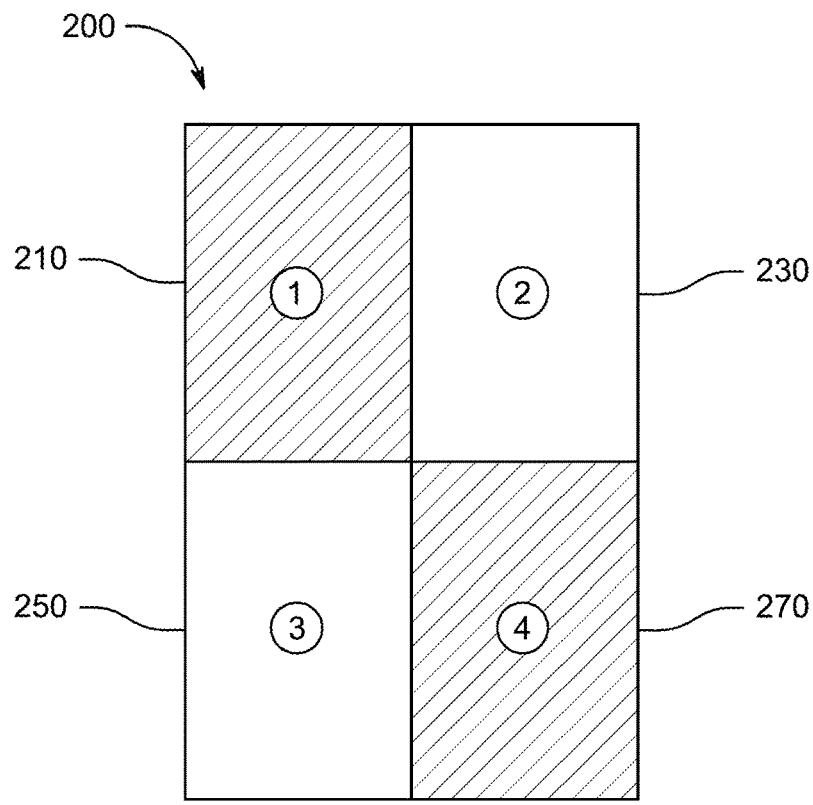
FIG. 2 shows an illustrative generic fractal map according to an embodiment.

Electronic device 100 can be a generic representation the hardware and software of a particular platform or client device. Each platform is different. The differences can be characterized by hardware configurations, software configurations, and ability to generate fractal maps according to embodiments discussed herein. Fractal maps are used herein to provide a methodological exploration of related articles or documents. The fractal maps display FIG. 2 shows an illustrative generic fractal map 200 according to an embodiment. Map 200 is arranged in a grid oriented coordinate system of four quadrants. The four quadrant arrangement is merely illustrative and it should be understood that the grid can be arranged to have any number of quadrants. However, for simplifying ease of discussion, the grid will be discussed herein as having only four quadrants, identified as quadrants Q1 210, Q2 230, Q3 250, and Q4 270. Each quadrant can be partitioned into two panes, one of which can represent metadata of an article and the other of which can include navigation history.

Figure 3:
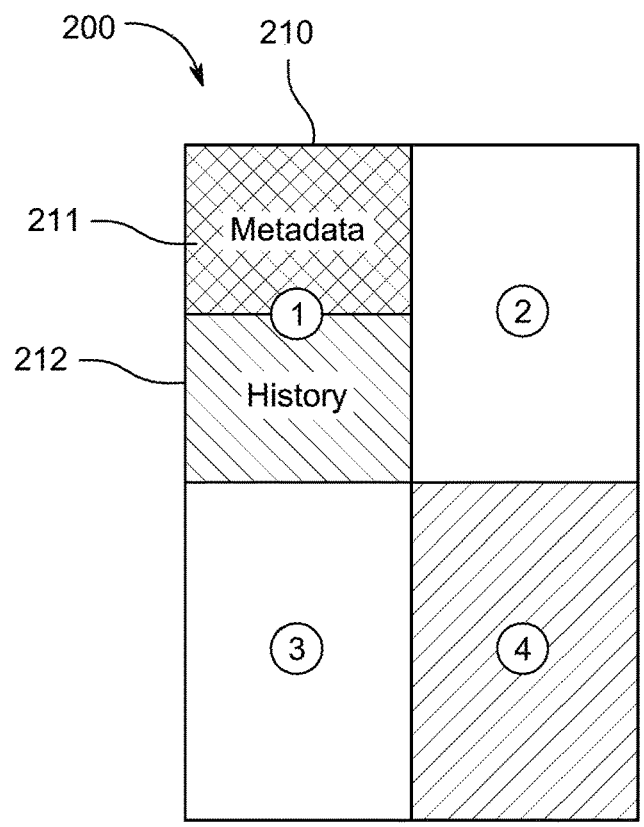
FIG. 3 shows a quadrant of fractal map according to an embodiment.

FIG. 3 shows Q1 210 having first pane 211 representing metadata, and second pane 212 representing history. Panes 211 and 212 are shown dividing Q1 210 in half with pane 211 representing the top half and pane 212 representing the bottom half. The metadata displayed in first pane 211 can include information pertinent to an article being presented in first pane 211. For example, the metadata may include the title, author, date of publication, domain, or other suitable information. The information presented as metadata in first pane 211 may be representative of an article, but does not display the actual webpage, or portion thereof, of the article. The metadata representation of the article may provide a less cluttered appearance, and may enable faster reading and quicker recognition of the article, taking into consideration that each metadata pane of each quadrant is displaying article information. This may also allow for faster rendering of content for display as less data would have to be downloaded over the Internet. First pane 211 may also be shaded a particular color. The color can be used to represent many different characteristics that enable the user to quickly differentiate and understand context of different articles and how they are related. For example, the color of each metadata pane can indicate strength of relationship with a parent article, a grandparent article, a great grandparent article, or some other hierarchically superior article. As another example, the color can be used to relay information related to navigation such as whether the article has been read.

Second pane 212 represents the navigation history associated with Q1 210. As will be explained in more detail below, when a user desires to view more articles that are related to the article shown in first pane 211, the user can navigate to one or more higher levels within Q1 210. Each higher level is presented as a new fractal map that is arranged in the four quadrant format. The user can navigate back from the higher levels to prior levels. When the user navigates back from a higher level, the navigation history displays a scaled down version of the higher level(s), thus providing a graphical representation of the user's navigation of all articles displayed in the higher level fractal maps. For example, if the user navigated from a level 1 map to a level 2 map and then to a level 3 map, and then navigates back to the level 1 map, the navigation history can graphically show both the level 2 and level 3 maps, with the level 3 map shown as being nested within the level 2 map (because the user navigated from level 2 to level 3). The scaled down version of the higher levels depicted within the navigation history may be presented as color coded boxes. The color can be used to represent any number of different factors such as strength of the relationship between articles, user actions, user preferences, and ratings.

Figure 4:
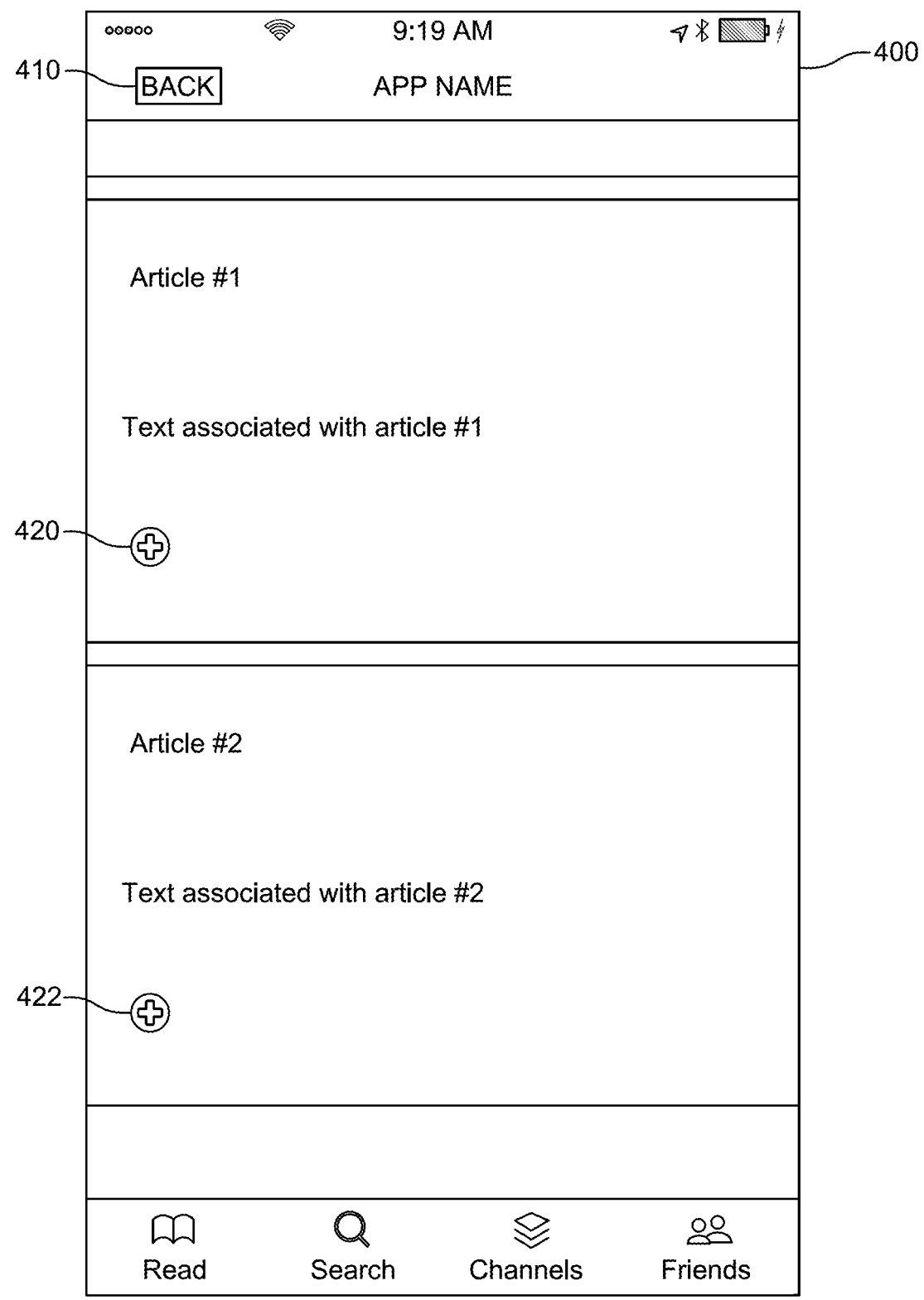
FIG. 4 shows an illustrative user interface according to an embodiment.

FIG. 4 shows an illustrative user interface 400 according to an embodiment. User interface 400 can be an application running on a device that provides a user with access to different channels of content available on the Internet. The user can scroll through articles by causing different articles to appear on the screen. The user can navigate back to a previous screen by selecting back icon 410. A user can select an article such as Article 1 or Article 2, as shown, to read that particular article or the user can select explore icon 420 or 422 to explore articles related to that particular article using fractal map navigation according to embodiments described herein. When the user selects explore icon 420 or 422, the user may be presented with fractal map 500 of FIG. 5A.

Figure 5A:
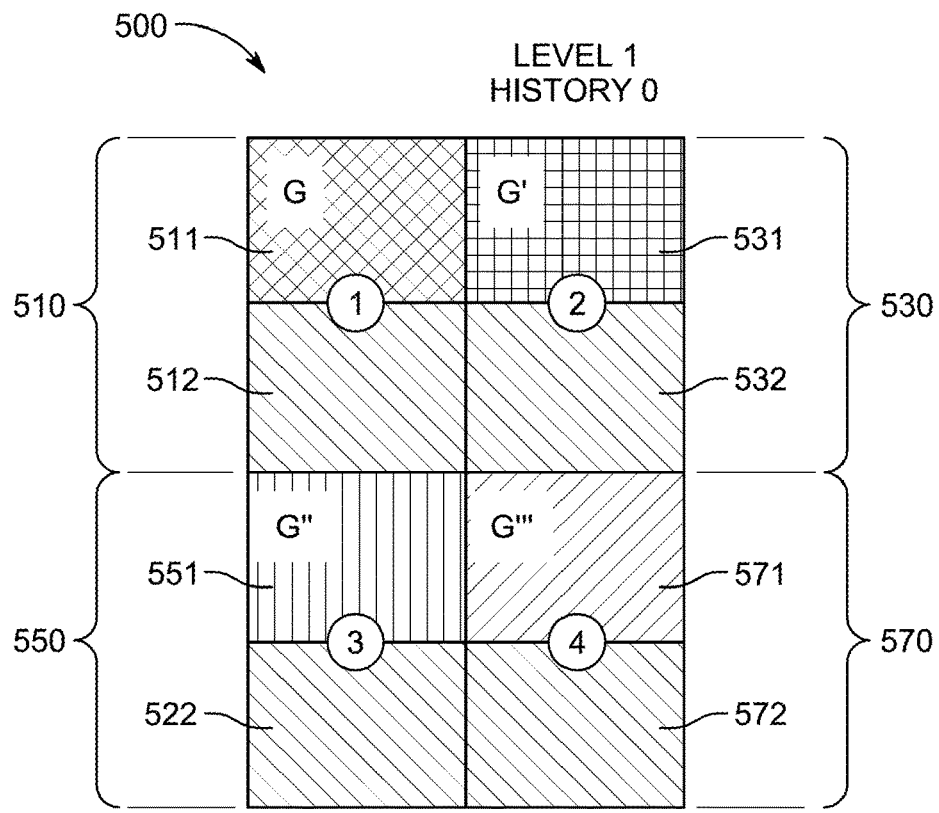
FIGS. 5A-5F show illustrative fractal maps, according to an embodiment.
Figure 5B:
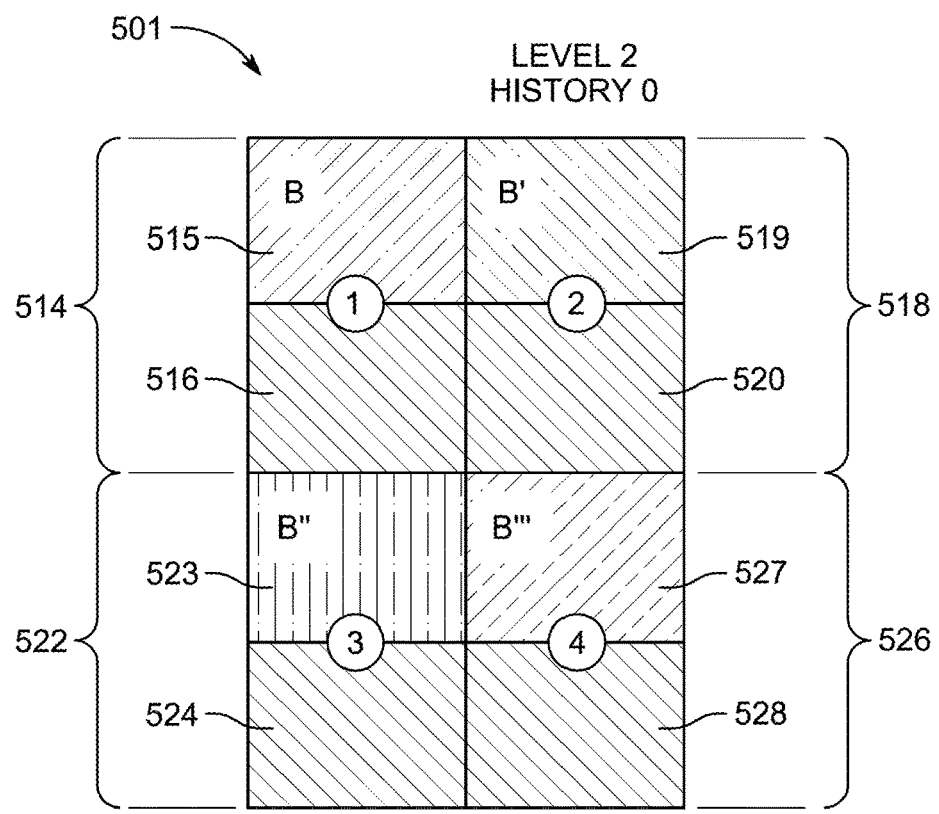
Figure 5C:
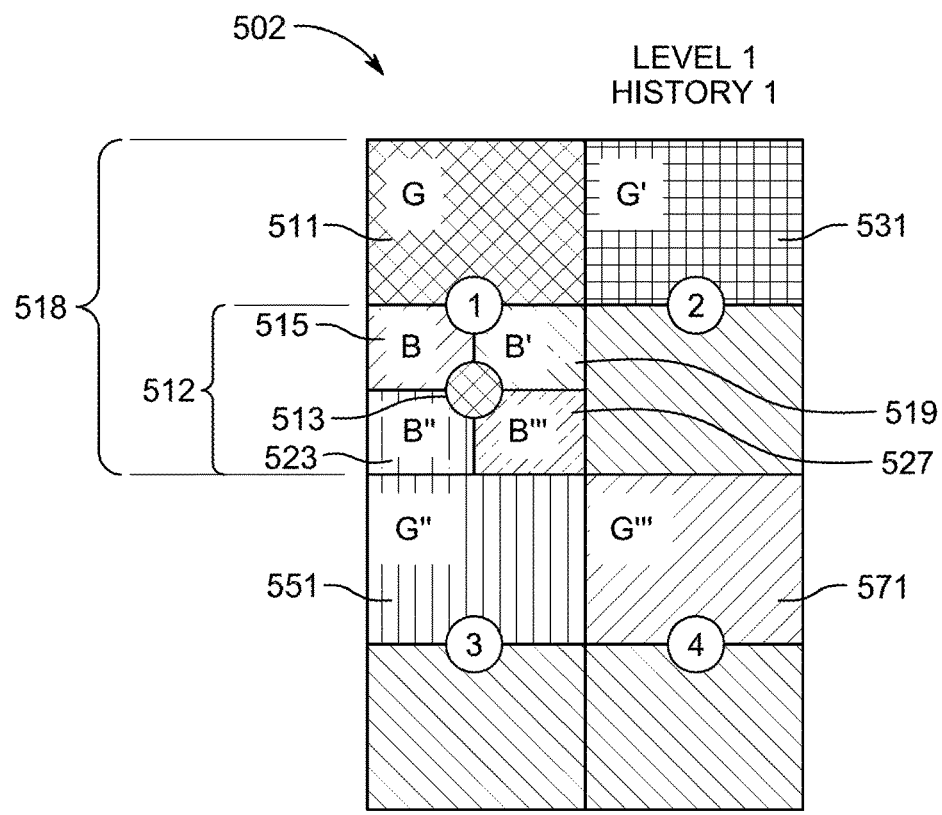

FIGS. 5A-5C show illustrative fractal maps showing a sequence when a user navigates from a level 1 map to a level 2 map and back to a level 1 map according to embodiment. FIG. 5A shows fractal map 500 having four quadrants Q1 510, Q2 530, Q3 550, and Q4 570. Metadata panes 511, 531, 551, and 571 of each quadrant have respective background colors of G, G', G", and G'", which represent varying shades of the color green. The shades of green may correspond to the degree of similar the articles in panes 511, 531, 551, and 571 have with respect to the parent article in FIG. 4. Although not shown in FIG. 5A, metadata panes 511, 531, 551, and 571 can include contextual information (e.g., title, author, website) related to the articles they represent. Map 500 may be a level 1 map with a 0 history. History may represent the number of successive generations that are being shown in the history navigation pane. Map 500 may be a level 1 map because it represents the first level map of fractal map navigation. The history is 0 because there is no navigation history to show in any of the navigation history panes 512, 532, 552, and 572. Assuming the user wishes to see additional articles related to the article shown in metadata pane 511, the user may select an explore icon (not shown) in history pane 512. In response to this particular user selection, the user may be presented with map 501.

Map 501 can represent a level 2 fractal map because it represents the "children" of Q1 510. Children, in this context, refer to articles that are deemed related to the parent article. Map 502 includes child quadrants Q1 514, Q2 518, Q3 522, and Q4 526. Metadata panes 515, 519, 523, and 527 may include contextual information (not shown) and have respective background colors of B, B', B", and B'", which represent varying shades of the color blue. History is still 0 because there is still no history information to show. However, when the user does navigate back to level 1, map 502 will form the basis of a history navigation fractal map (shown in FIG. 5C). If desired, the user can select any article to read in map 501 by selecting the article listed in one of panes 515, 519, 523, and 527, or the user can choose to navigate to additional articles related to any one of the articles displayed in map 501 by selecting an explore icon (not shown) in each of the history panes 516, 520, 524, 528.

FIG. 5C shows map 502, which shows a level 1 map when the user navigates back from map 501, which is a level 2 map. Map 502 is a level 1 map with one generation of children being shown the history pane of Q1 510. Thus, history is 1 to signify that one generation of children is shown. Map 503 is same as map 501, except for the addition of map 502 in history pane 512. The addition of map 502 into history pane 512 provides the user with a snap shot of where he/she has previously navigated. The color background of metadata panes 515, 519, 523, and 527 may be used to represent scaled down versions of quadrants 514, 518, 522, and 527. If a user desires to read one of the articles in history pane 512, he or she can select explore icon 513 to return to map 501 and then select the desired article or further explore additional articles related to those shown in map 501. Alternatively, the user can select any of the articles shown in map 502 by directly selecting it (e.g., user selects pane 515 to access that article).

Figure 5D:
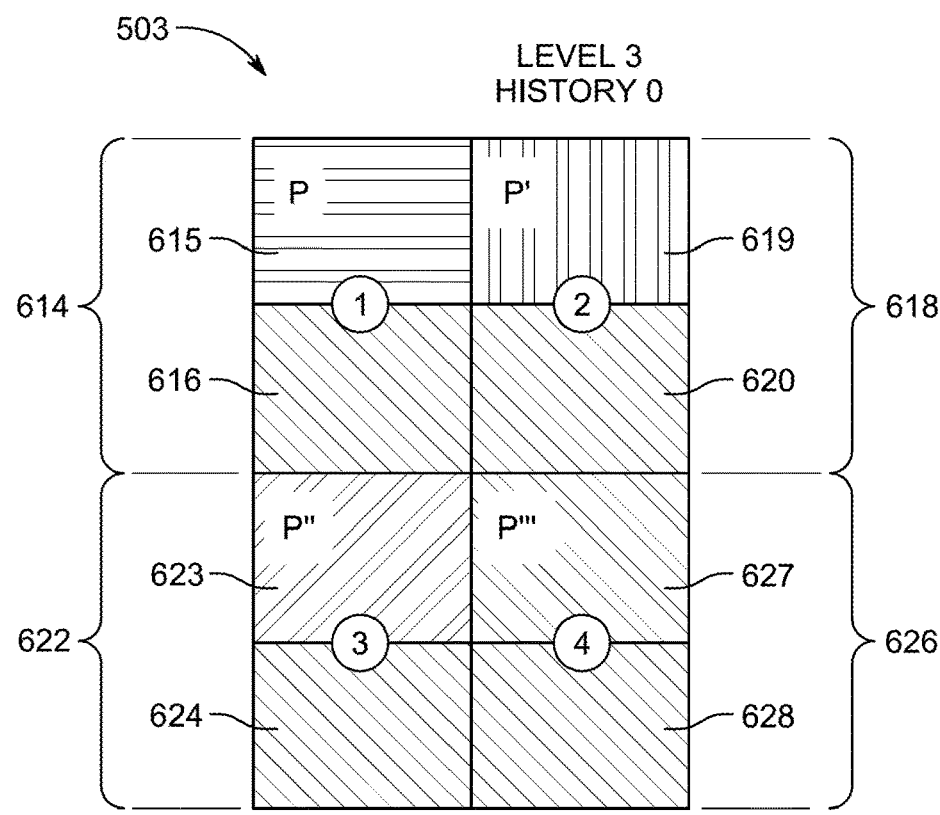

FIG. 5D shows illustrative map 503 that may be presented to the user if the user selected an explore icon (not shown) in navigation pane 516 of map 502. Selection of the explore icon in a level 2 map may result in the display of a level 3 map, currently shown as map 503. Map 503 shows the children of quadrant Q1 514 arranged as quadrants Q1 614, Q2 618, Q3 622, and Q4 626. Metadata panes 615, 619, 623, and 627 may include contextual information (not shown) and have respective background colors of P, P', P", and P'", which represent varying shades of the color purple. History is 0 because there is no history information to show. The level of map 503 is 3 because it shows a second generation of children originating from quadrant 510 of map 500.

Figure 5E:
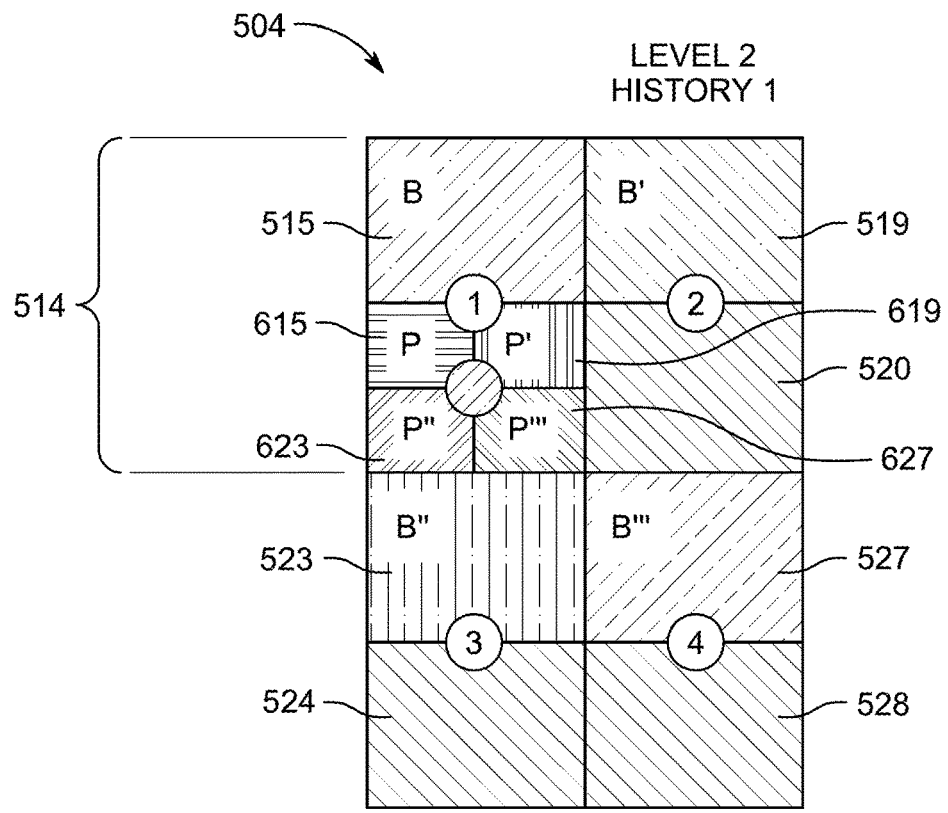

FIG. 5E shows illustrative map 504 that may be presented to the user if the user navigates back from map 503. Map 504 is a level 2 map and has a history of 1. Map 504 is similar to map 503, but includes one generation of children, the children of quadrant Q1 514.

Figure 5F:
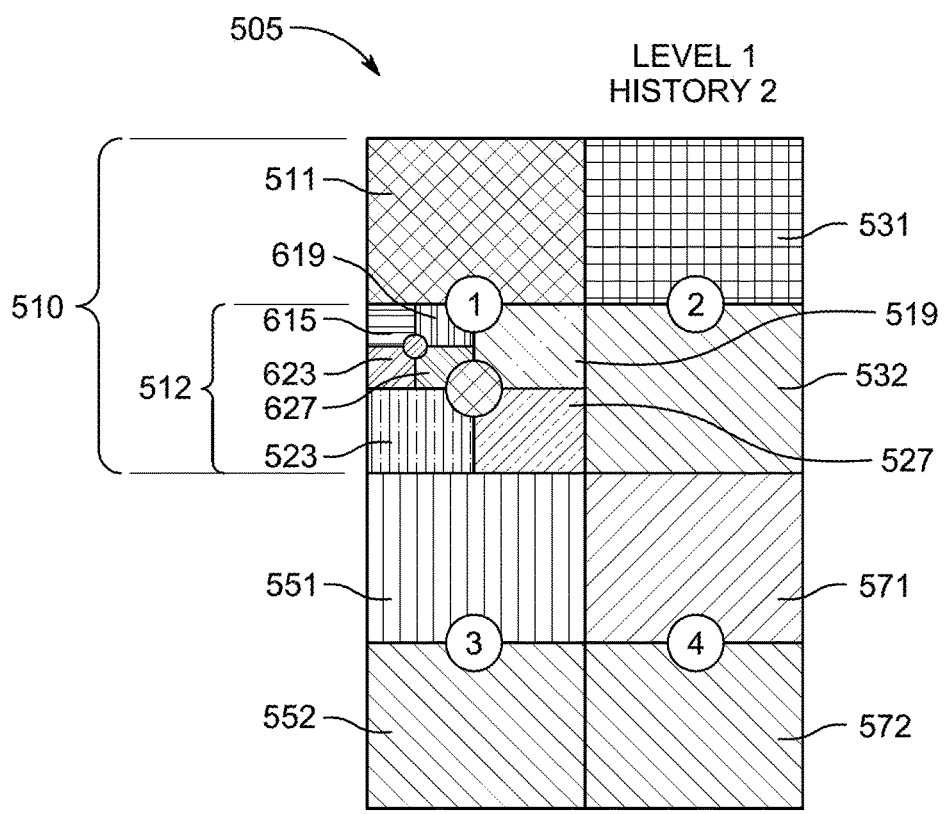

FIG. 5F shows illustrative map 505 that may be presented to the user if the user navigates back from map 504. Map 501 is a level 1 map and has a history of 2. Map is similar to map 500, but includes two generation of children, the children and grandchildren Q1 510. In particular, history navigation pane 512 shows the level 2 children of map 501, except metadata pane 516 shows its children—metadata panes 615, 619, 623, and 627. Thus, navigation pane 512 shows what the user discovered when he navigated from the level 1 map of map 500 to the level 3 map of map 503.

The manner in which the navigation pane displays navigation history is recursively dependent on how many generations of children are explored with respect to a parent. Map 505, for example, showed two generations of children because the user navigated through the user interface to the grandchildren of quadrant Q1 510, and returned back to the parent. If the user navigates to the great grandchildren of parent and navigates back to the parent, the navigation history pane can show the children, the grandchildren, and the great grandchildren in the form of a fractal map. In some embodiments, it may be desirable to limit how many generations the user can navigate to avoid situations that may overcrowd the navigation pane when navigation returns to the parent.

Figure 6:
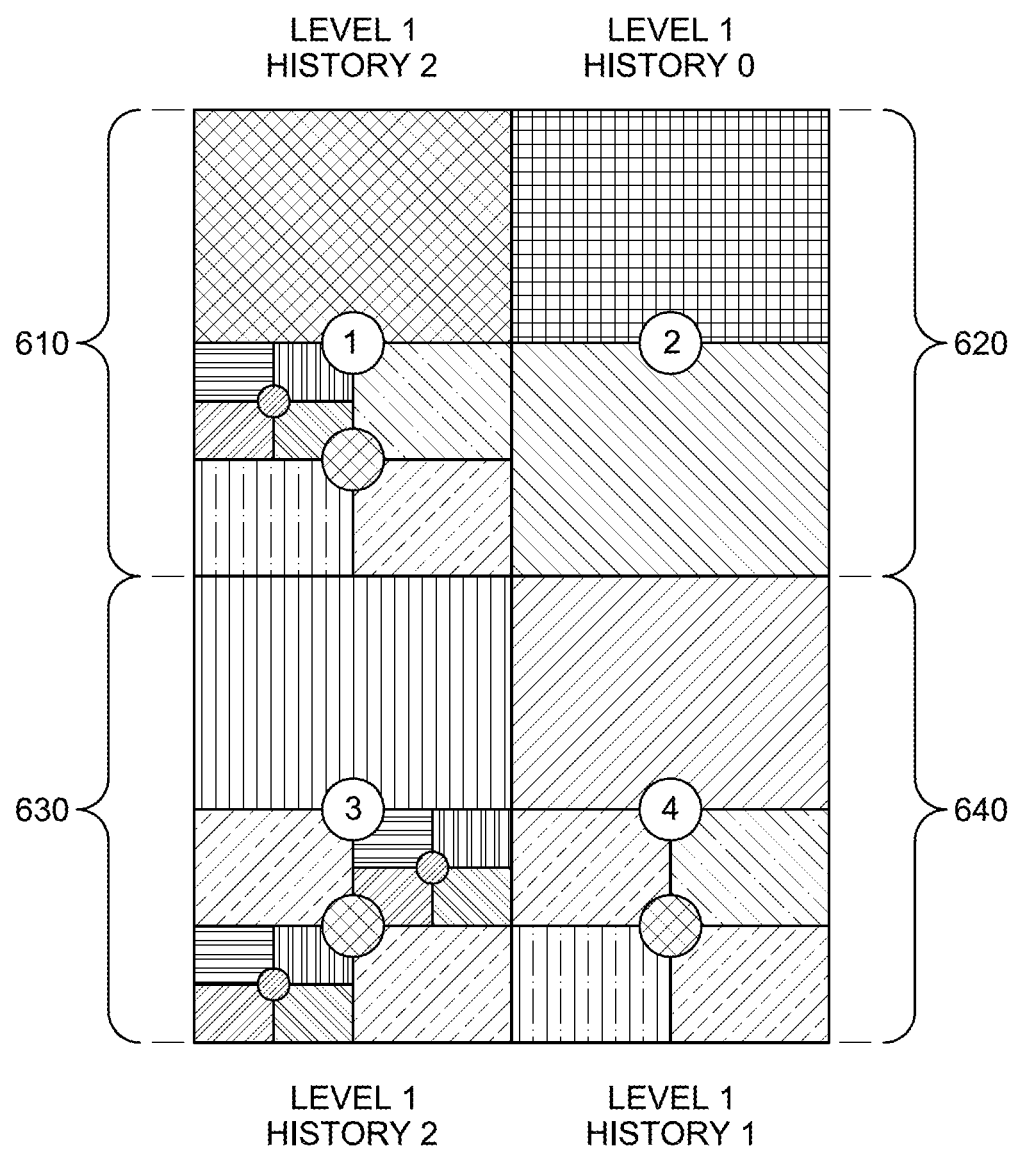
FIG. 6 shows illustrative fractal map in which the user explored different articles to various levels and then returned to a parent level, according to an embodiment.

FIG. 6 shows illustrative fractal map 600 in which the user explored different articles to various levels and then returned to level 1, according to an embodiment. Map 600 shows that Q1 610 includes two generations, but for only one child, Q2 620 includes no generations, Q3 630 includes two generations for two separate children, and Q4 640 includes one generation of children.

FIGS. 7A-7J show an illustrative user interface flow that uses fractal map navigation according to an embodiment. Starting with FIG. 7A, a user is presented with a media feed that he or she can scroll through to find a web page of interest. If the user sees something of interest, such as article 701 he can select plus button 705 to explore web pages that are similar to the article associated with button 705. In response to selecting button plus 705, screen 710 can be presented to the user. Screen 710 can present four web pages, each arranged in a quadrant (as discussed above). These quadrants can serve as the parents that allow the user to methodologically explore all related topics. The user can read article 711 by selecting the metadata pane associated with article 711. If the user desires to search for an additional four webpages related to article 711, the user can select plus button 715. The colors of each quadrant can indicate the proximity of the web pages with article 701 of FIG. 7B. The colors are labeled as C1-C4.

Figure 7A:
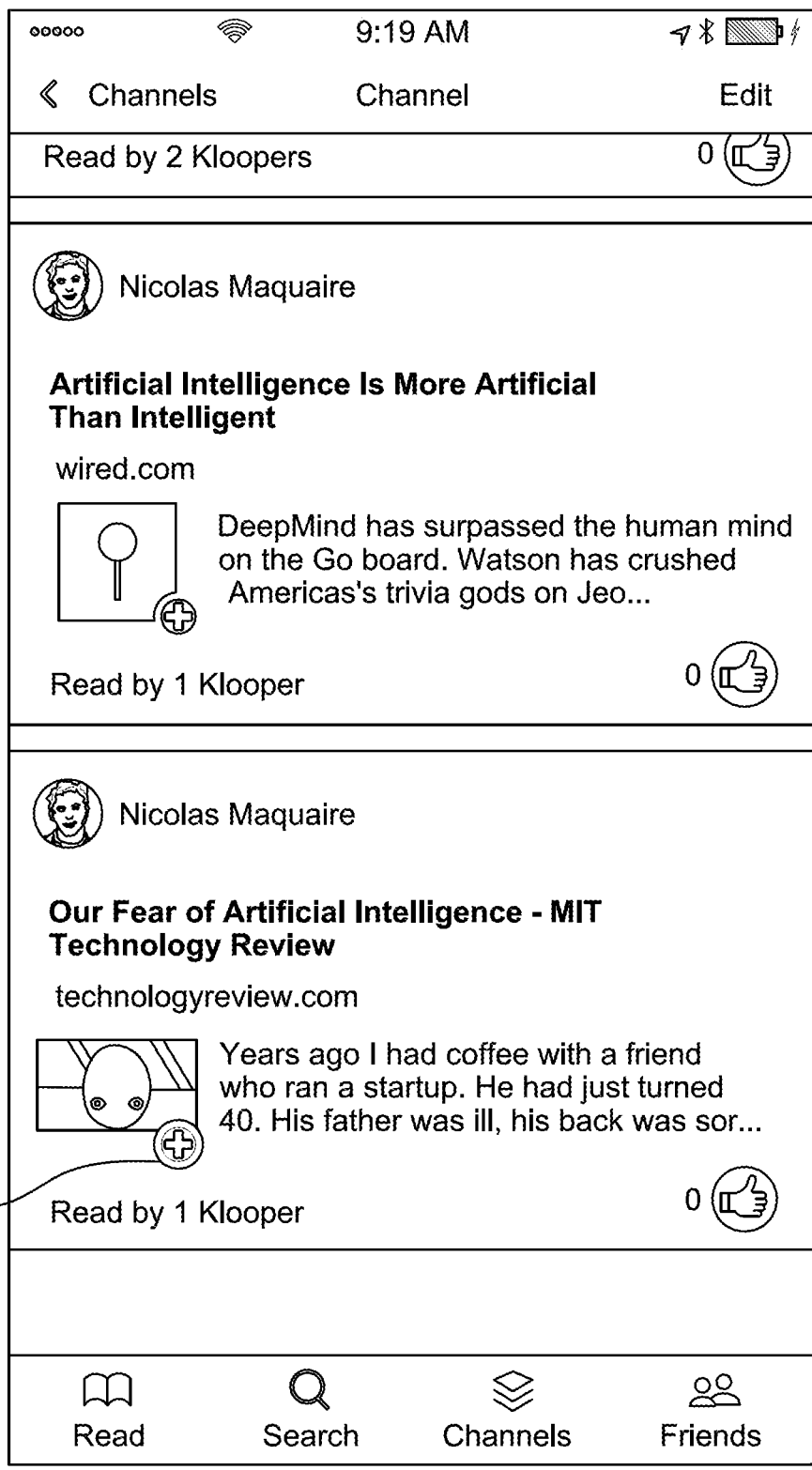
Figure 7B:
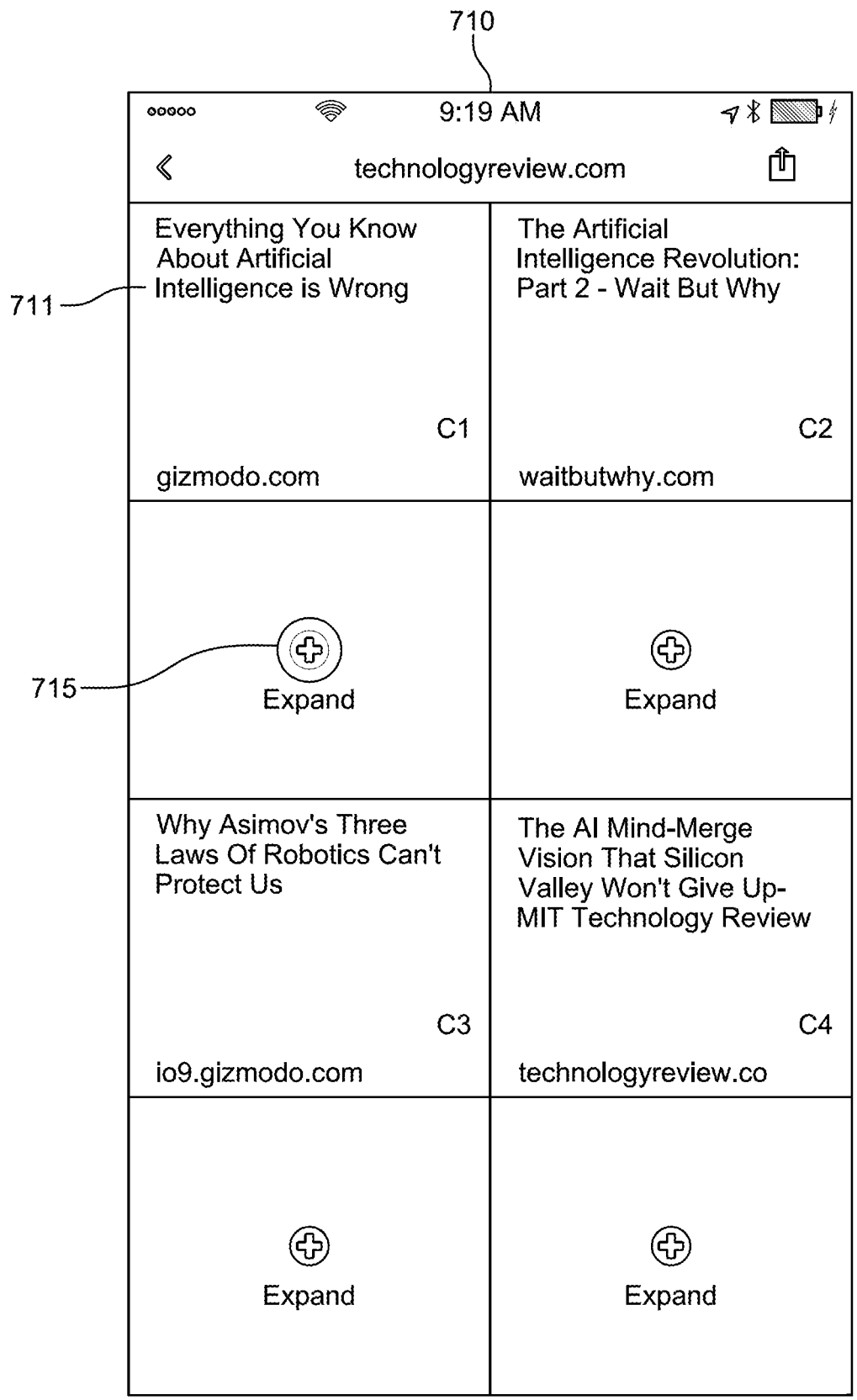
Figure 7C:
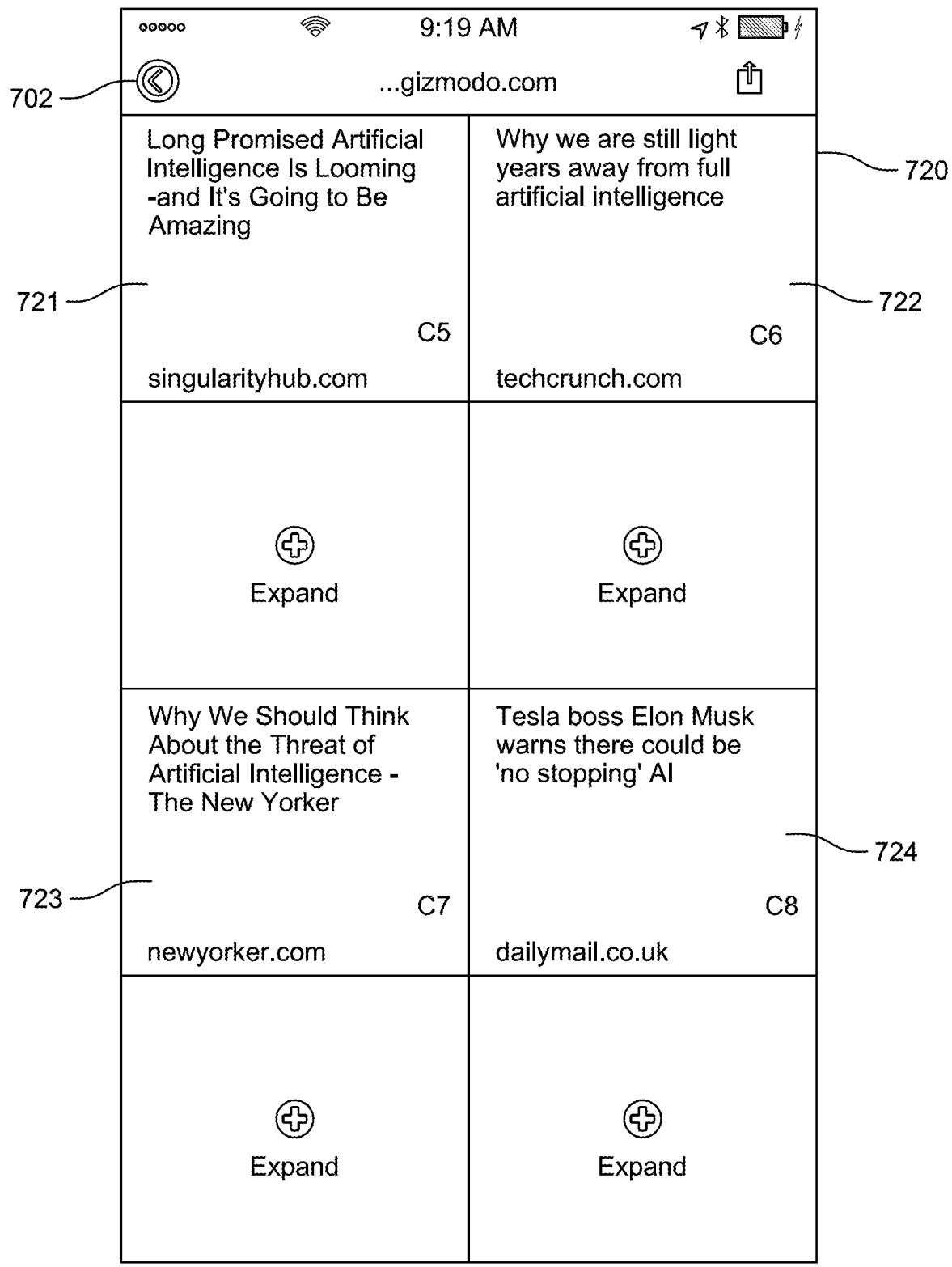
Figure 7D:
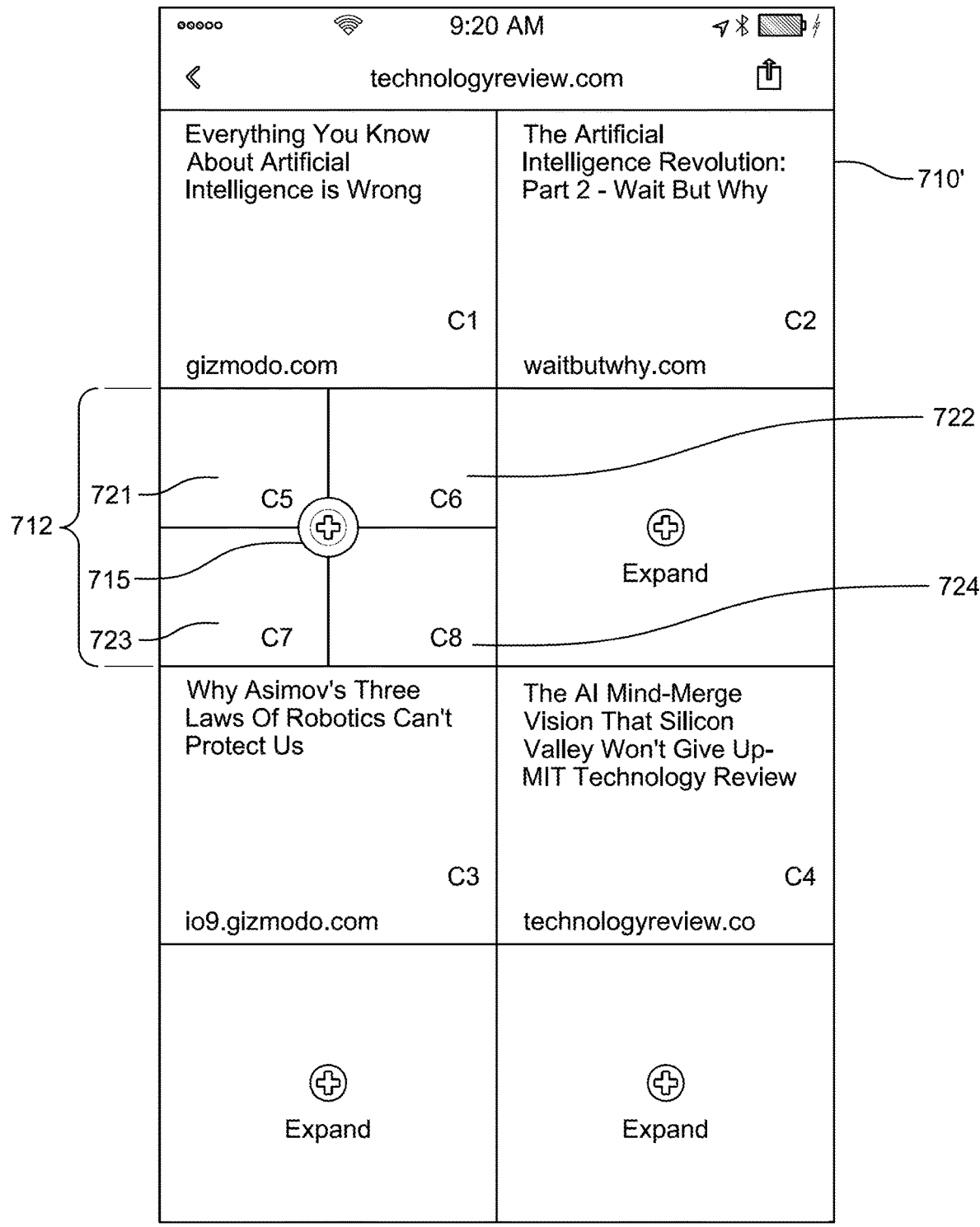
Figure 7E:
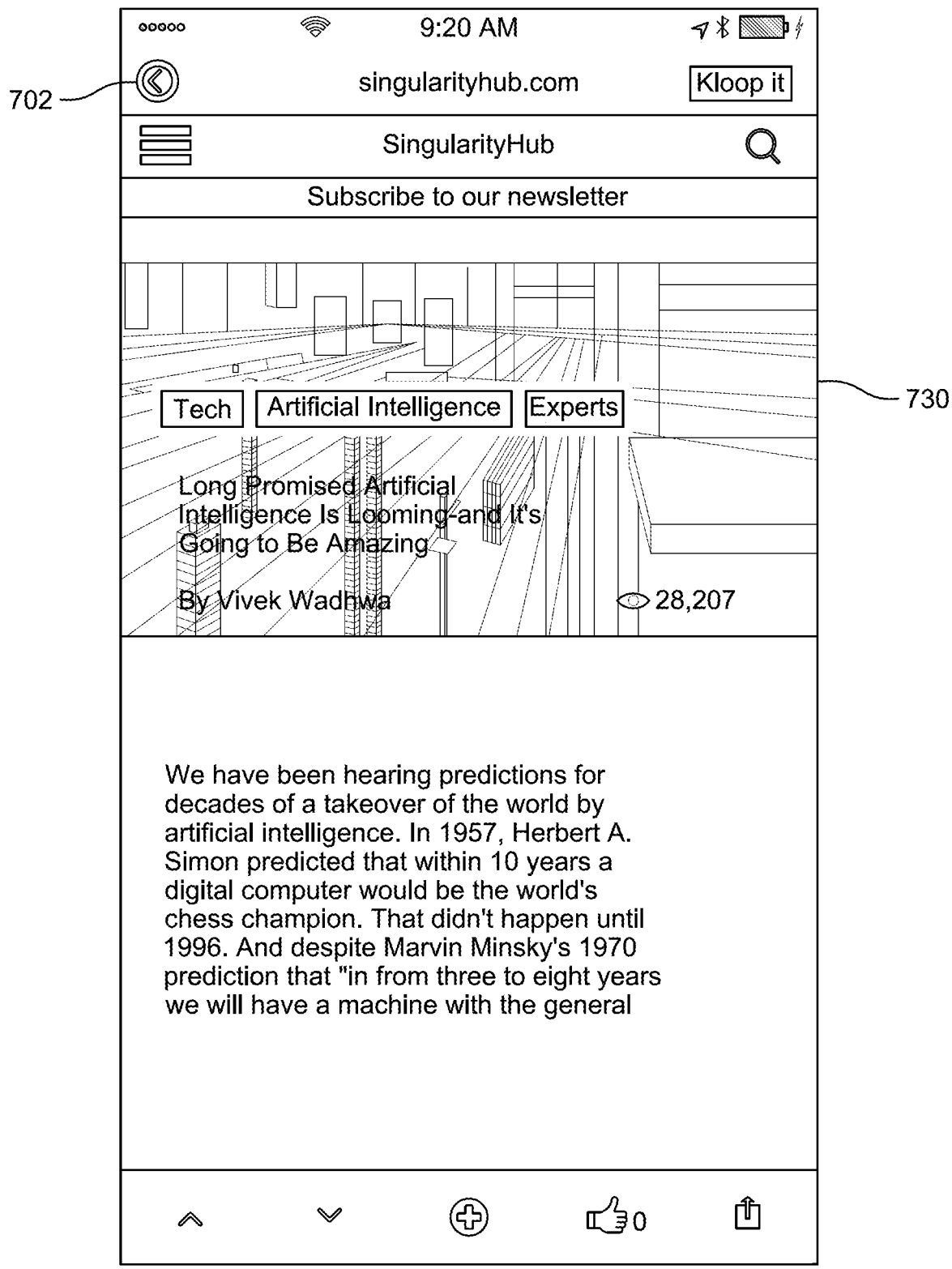
Figure 7F:
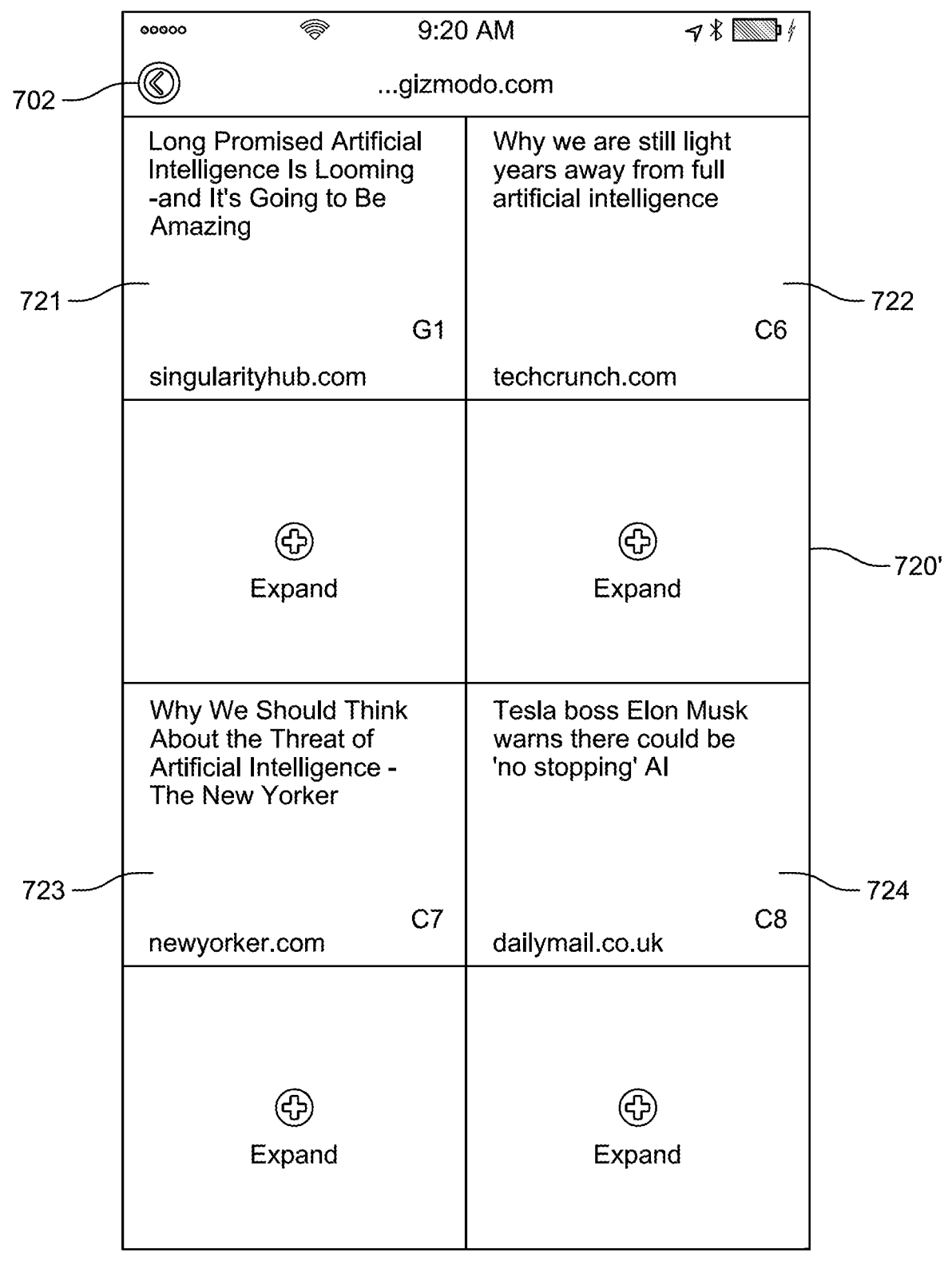
Figure 7G:
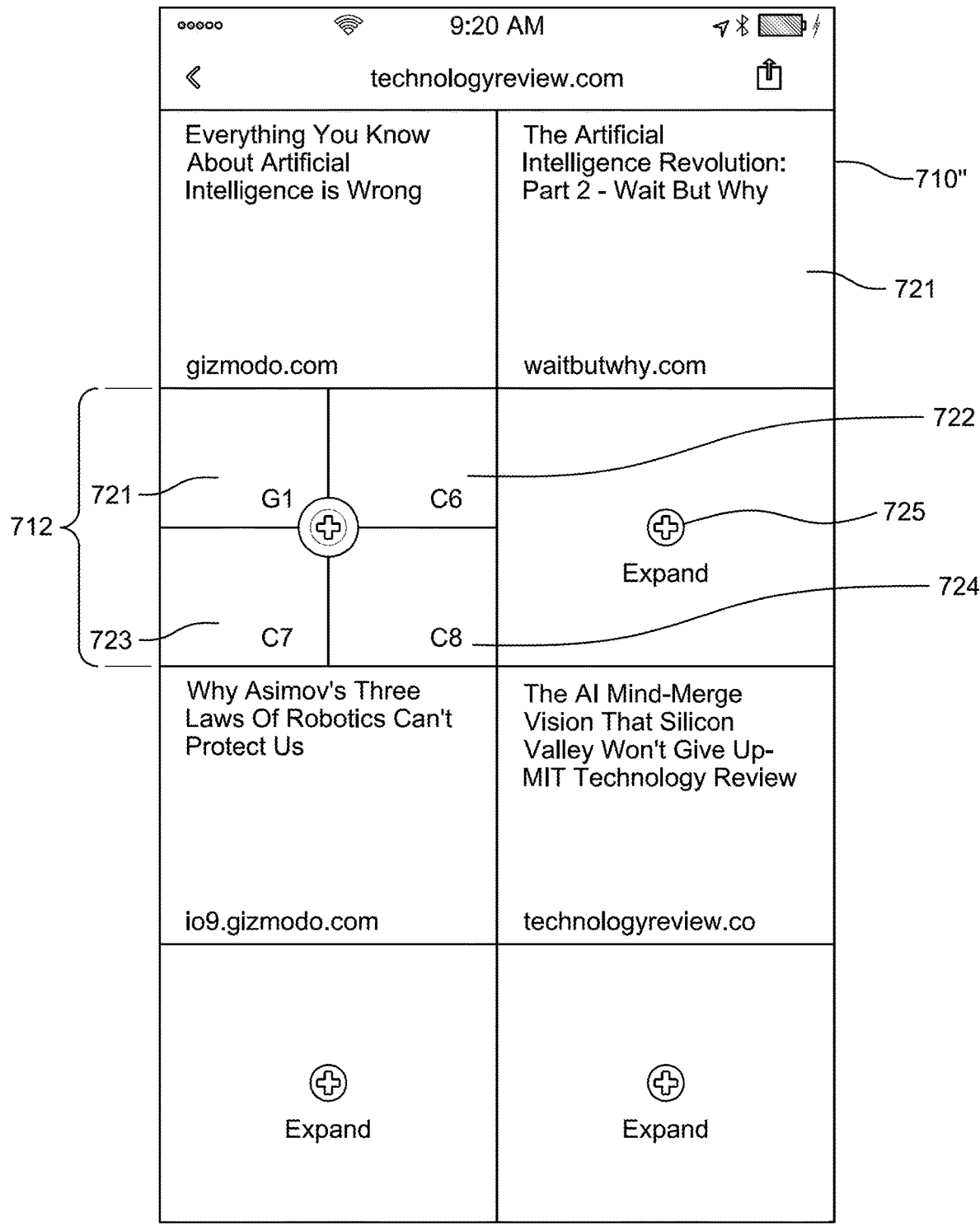

Assuming the user wishes to know which are the four closest web pages to the article 711, the user selects plus button 715, which causes screen 720 of FIG. 7C to be displayed. Screen 720 includes four quadrants, each including a web page related to article 711. Each quadrant includes contextual information 721-724 for each web page, including, for example, the title and website publishing the article, and having respective colors C5-C8. Upon reading screen 720, and the may be able to quickly deduce or have a better idea of the context of article 711 of FIG. 7B, the may decide to navigate back to the prior screen by selecting navigation button 702. In response to user selection of button 702, screen 710' of FIG. 7D can be presented. Screen 710' includes parent quadrants with their respective contextual information, but now includes navigation pane 712 that includes context information 721-724 of screen 720, which is level 2 map (or child screen) of screen 710. The colors, C5-C8, are maintained to assist the user in understanding the relative similarity of article 711 to the articles in navigation history pane 712. The user may press plus button 715 to return to screen 720 (illustrated in FIG. 7C).

If the user selects contextual information 721, the user may be directed to website associated with contextual information 721. The article associated with contextual information is displayed as screen 730 on FIG. 7E. Here, the user may read the article and can return to the prior screen by selecting navigation button 702. In response to user selection of button 702, screen 720' of FIG. 7F can be provided. In FIG. 7F, the color of context information 721 changed from C5 to G1 to indicate to the user that he has read that article. In response to user selection of button 702, the user returns to the parent quadrants screen 710" of FIG. 7G. As shown, the color G1 associated with contextual information 721 is now included in navigational pane 712. Screen 710" advantageously enables a user to simultaneously see which web pages he visited and which web pages he has read.

Figure 7H:
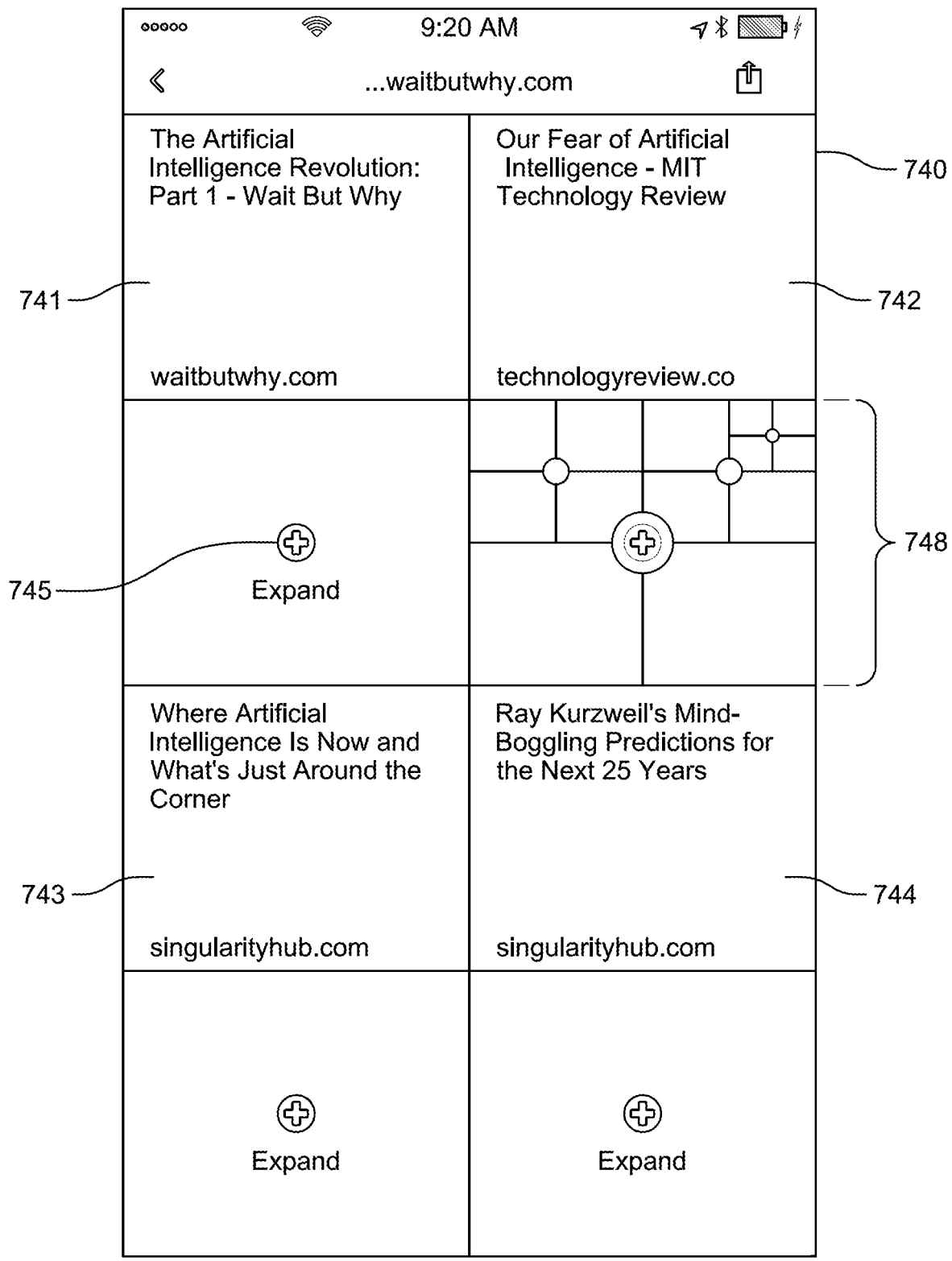
Figure 7I:
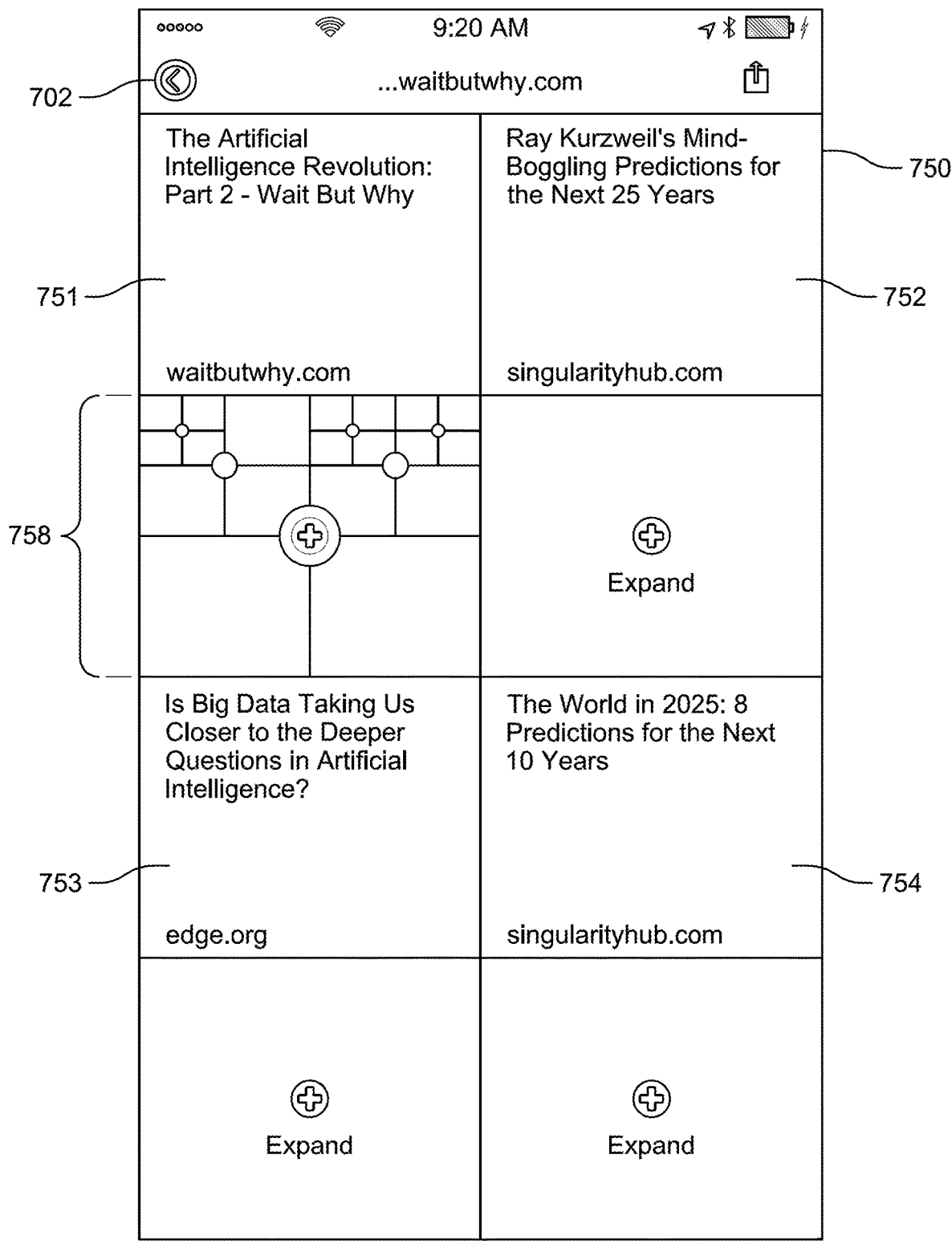
Figure 7J:
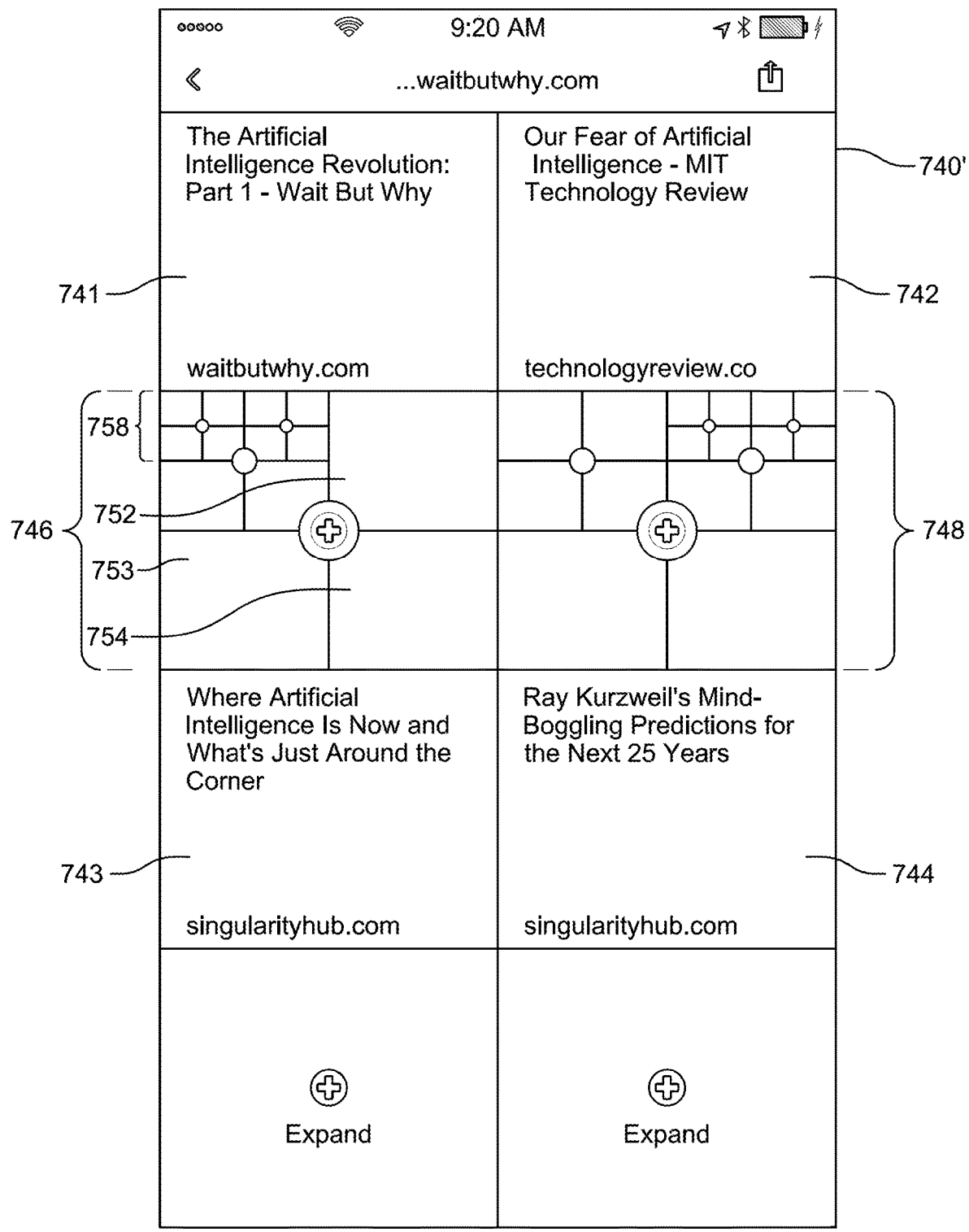

If the user decides to explore article 721, the user can select plus button 725, which can result in the display of screen 740 of FIG. 7H. Screen 740 shows articles 741-744 are related to article 721. Article 742 has already been explored, as evidenced by fact that this article is the same as article 701, and that navigation pane 748 includes previously explored articles. Assuming the user selects plus button 745 to further explore article 741, the user can be presented with screen 750 of FIG. 7I. In FIG. 7I, the user can see that he has already explored the first related article 751, but not articles 752-754. In addition navigation pane 758 is populated with previously explored articles. When the user selects navigation button 702, he can be presented with screen 740' as shown in FIG. 7J. Screen 740 shows articles 741-744, along with navigation panes 746 and 748. Pane 746 includes navigation pane 758 of screen 750 and articles 752-754.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 8:
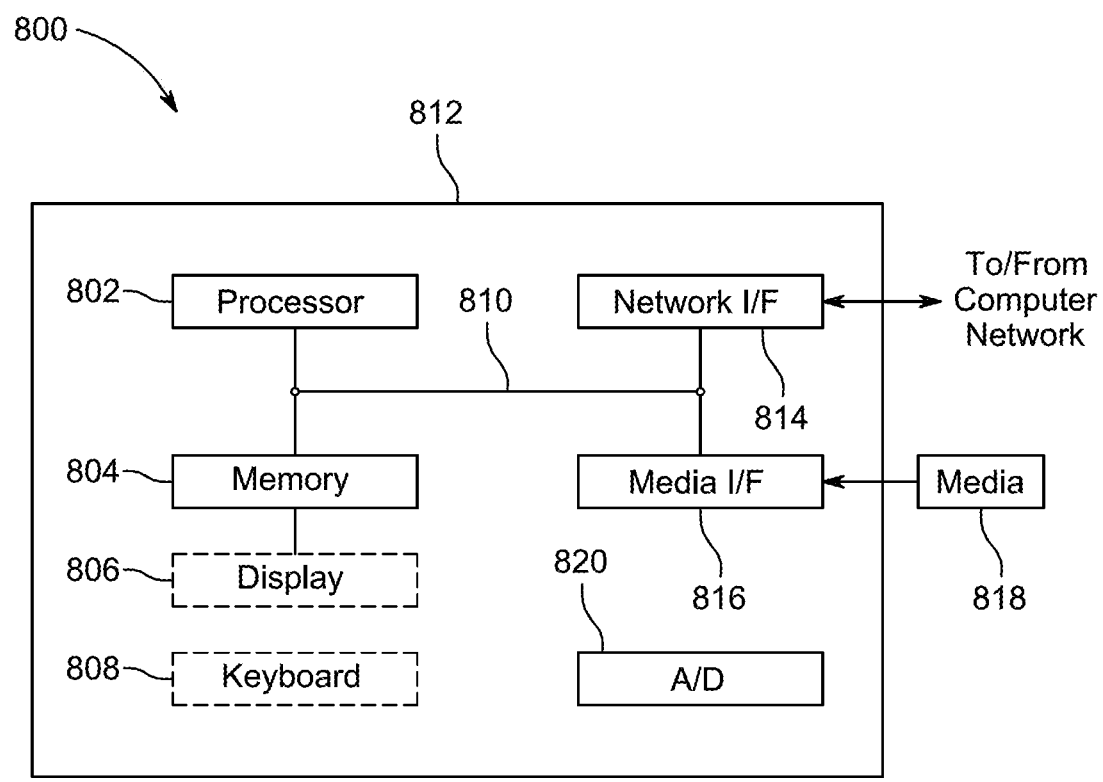
FIG. 8 depicts an exemplary web navigation tool, according to an embodiment

One or more embodiments can make use of software running on a general purpose computer or workstation. FIG. 8 depicts an exemplary web navigation tool 800 that may be useful in implementing one or more aspects and/or elements of the present invention. With reference to FIG. 8, such an implementation might employ, for example, a processor 802, a memory 804, and an input/output interface formed, for example, by a display 806 and a keyboard 808.

The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like.

In addition, the phrase "input/output interface" as used herein, is intended to include, for example, one or more mechanisms for inputting data to the processing unit (for example, mouse), and one or more mechanisms for providing results associated with the processing unit (for example, printer). The processor 802, memory 804, and input/output interface such as display 806 and keyboard 808 can be interconnected, for example, via bus 810 as part of a data processing unit 812. Suitable interconnections, for example via bus 810, can also be provided to a network interface 814, such as a network card, which can be provided to interface with a computer network, and to a media interface 816, such as a diskette or CD-ROM drive, which can be provided to interface with media 818.

Analog-to-digital converter(s) 820 may be provided to receive analog input, such as analog video feed, and to digitize same. Such converter(s) may be interconnected with system bus 810.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 802 coupled directly or indirectly to memory elements 804 through a system bus 810. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 808, displays 806, pointing devices, and the like) can be coupled to the system either directly (such as via bus 810) or through intervening I/O controllers (omitted for clarity).

Network adapters such as network interface 814 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 812 as shown in FIG. 8) running a server program. It will be understood that such a physical server may or may not include a display and keyboard.

Figure 9:
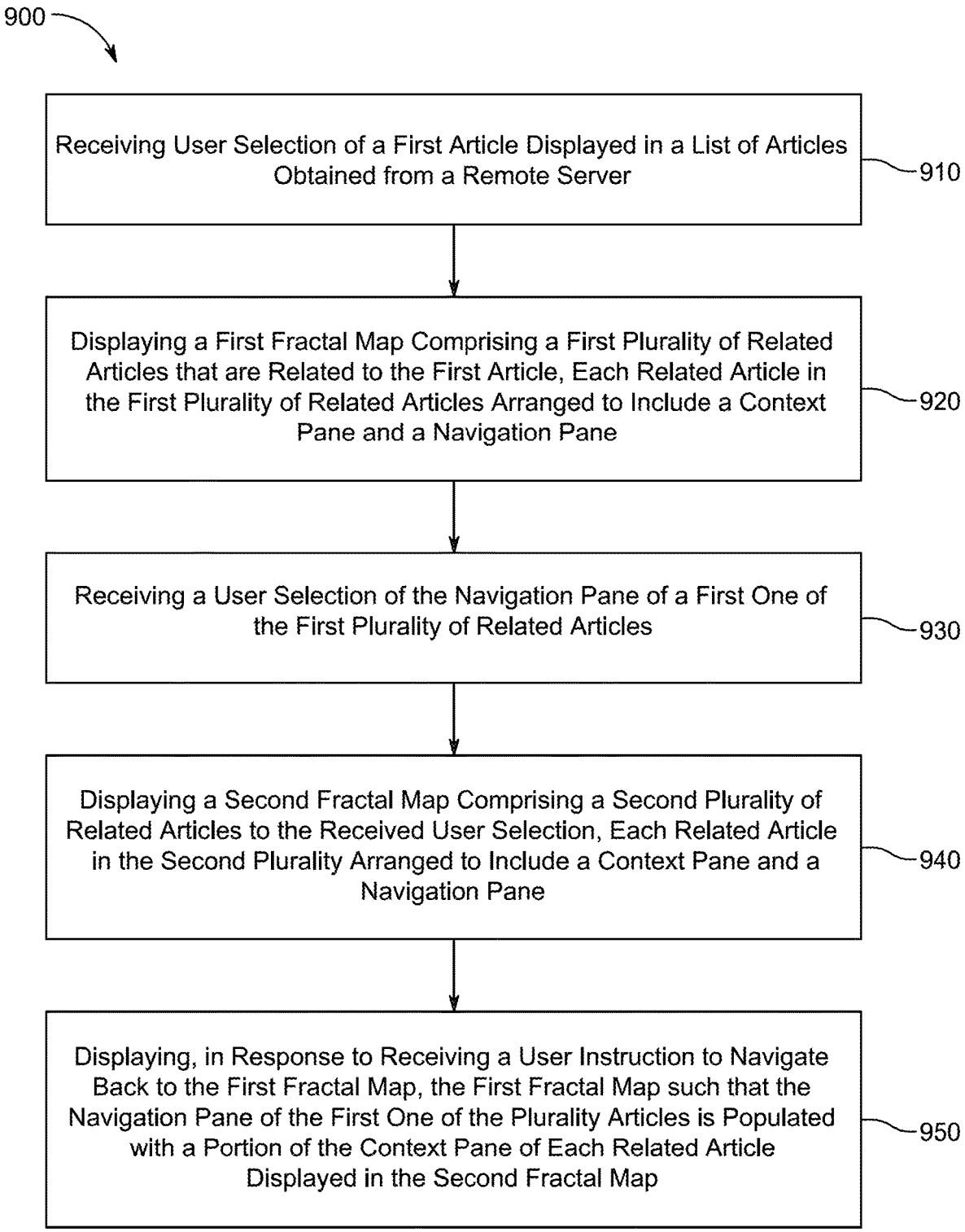
FIG. 9 shows an illustrative process for managing content according to an embodiment.

FIG. 9 shows an illustrative process 900 for managing content according to an embodiment. Starting step 910, a user selection of a first article displayed in a list of articles obtained from a remote server is received. At step 920, a first fractal map including a first plurality of related articles that are related to the first article is displayed, each related article in the first plurality of related articles arranged to include a context pane and a navigation pane. At step 930, a user selection of the navigation pane of a first one of the first plurality of related articles is received. At step 940, a second fractal map comprising a second plurality of related articles to the received user selection is displayed. Each related article in the second plurality is arranged to include a context pane and a navigation pane. At step 950, in response to receiving a user instruction to navigate back to the first fractal map, the first fractal map is displayed such that the navigation pane of the first one of the plurality articles is populated with a portion of the context pane of each related article displayed in the second fractal map.

It should be appreciated that the steps shown in FIG. 9 are merely illustrative and that additional steps may be added, and the steps may be omitted or rearranged in order.

Figure 10:
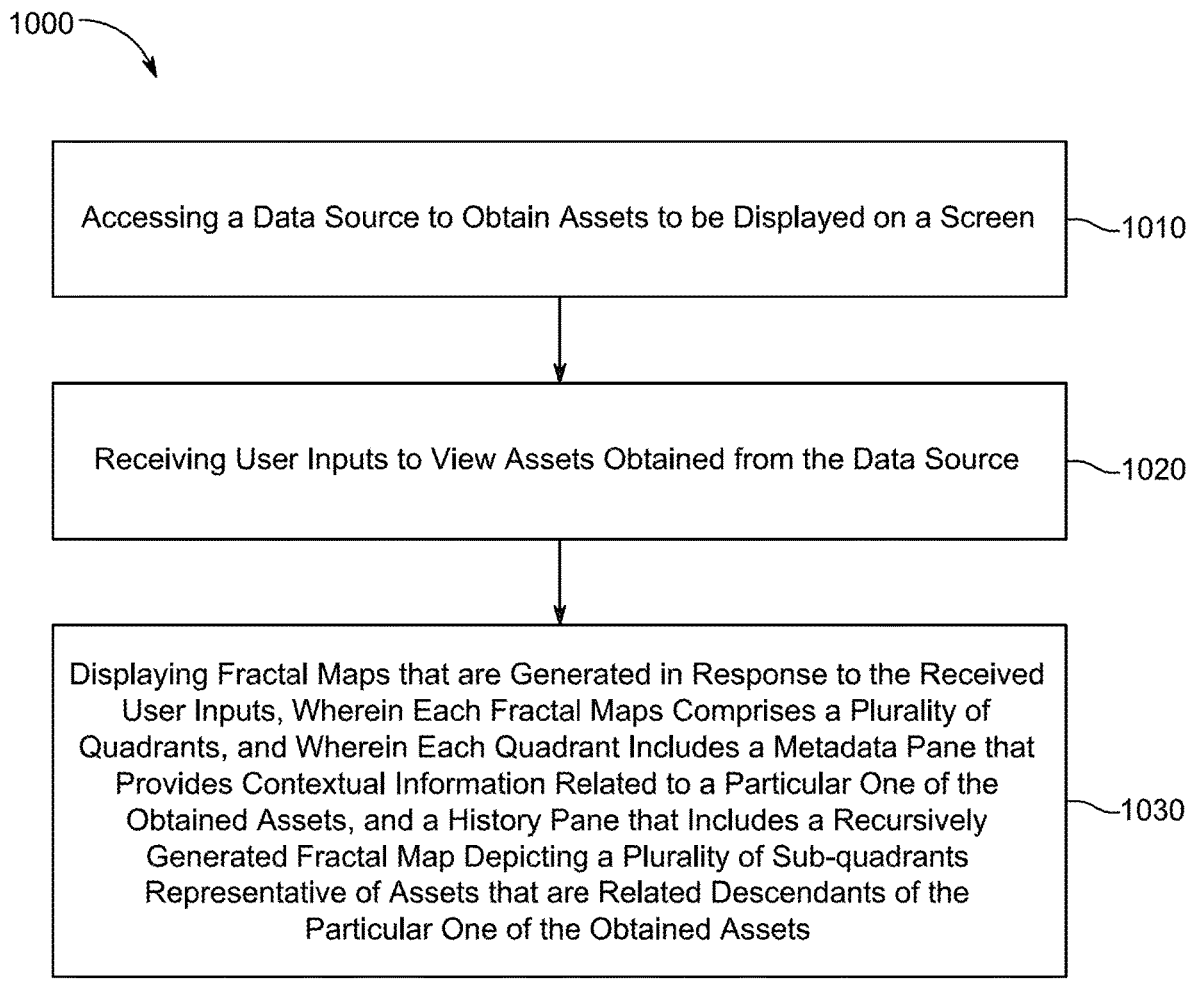
FIG. 10 shows an illustrative process 1000 for managing asset access according to an embodiment.

FIG. 10 shows an illustrative process 1000 for managing asset access according to an embodiment. Starting at step 1010, a data source is accessed to obtain assets to be displayed on a screen. At step 1020, user inputs are received to view assets obtained from the data source. At step 1030, fractal maps are displayed that are generated in response to the received user inputs. Each fractal map includes a plurality of quadrants, where each quadrant includes a metadata pane that provides contextual information related to a particular one of the obtained assets, and a history pane that includes a recursively generated fractal map depicting a plurality of sub-quadrants representative of assets that are related descendants of the particular one of the obtained assets. In some embodiments, a shade of color for each metadata pane can be calculated and the calculated shade of color can be displayed as a background color in each metadata pane. In another embodiment, a shade of color for each of the plurality of sub-quadrants representative of assets displayed in the history pane can be calculated and displayed. The shades of color for each metadata pane and for each of the plurality of sub-quadrants representative of assets are calculated to provide a visual representation of relative similarity to each other.

It should be appreciated that the steps shown in FIG. 10 are merely illustrative and that additional steps may be added, and the steps may be omitted or rearranged in order.

Figure 11:
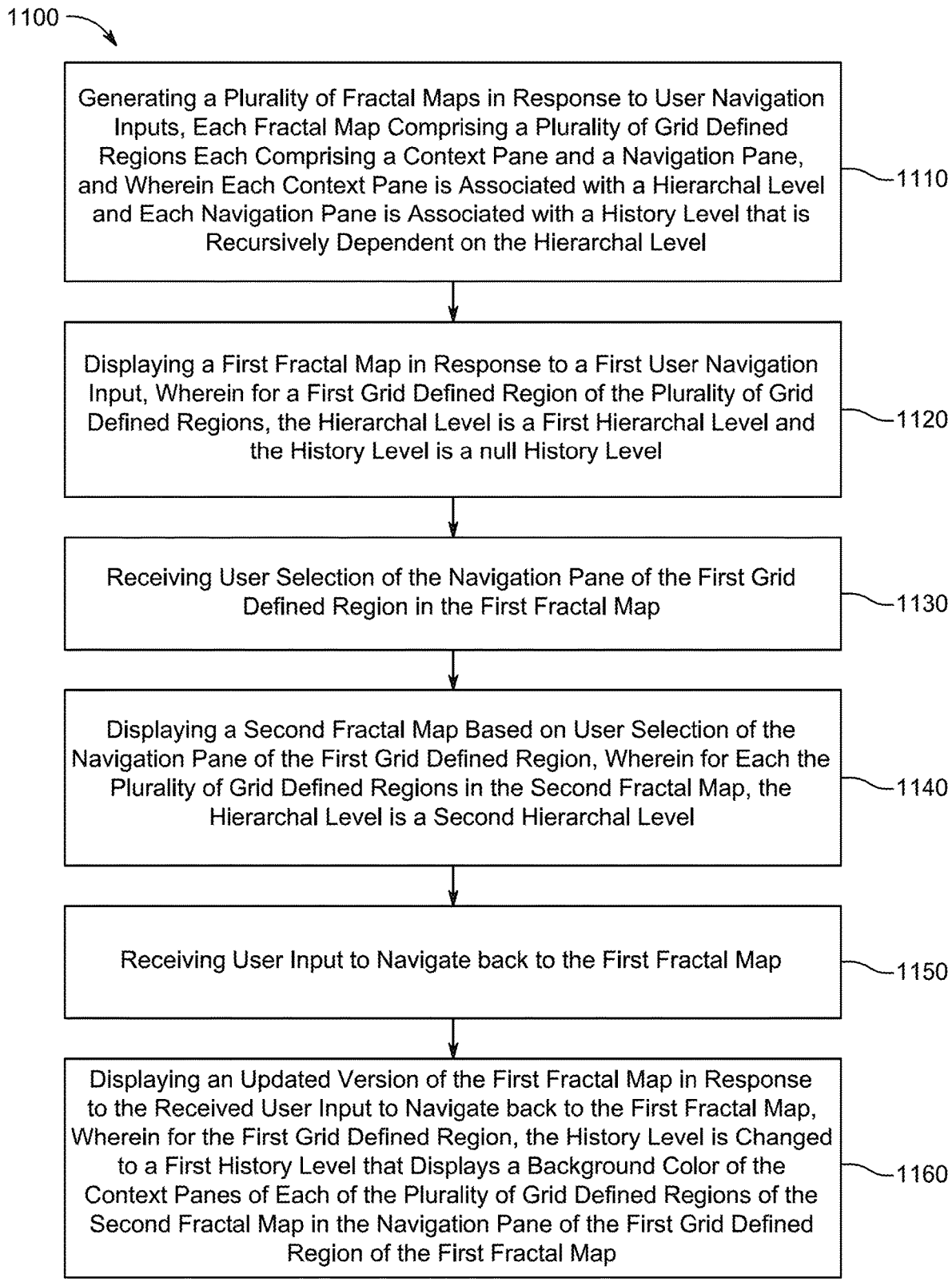
FIG. 11 shows an illustrative process 1100 according to an embodiment.

FIG. 11 shows an illustrative process 1100 according to an embodiment. At step 1110, a plurality of fractal maps are generated in response to user navigation inputs, each fractal map including a plurality of grid defined regions each comprising a context pane and a navigation pane, and wherein each context plane is associated with a hierarchal level and each navigation plane is associated with a history level that is recursively dependent on the hierarchal level. At step 1120, a first fractal map is displayed in response to a first user navigation input, wherein for a first grid defined region of the plurality of grid defined regions, the hierarchal level is a first hierarchal level and the history level is a null history level. At step 1130, user selection of the navigation plane of the first grid defined region in the first fractal map is received. At step 1140, a second fractal map is displayed based on user selection of the navigation plane of the first grid defined region, wherein for each the plurality of grid defined regions in the second fractal map, the hierarchal level is a second hierarchal level. At step 1150, user input to navigate back to the first fractal map is received. At step 1160, an updated version of the first fractal map is displayed in response to the received user input to navigate back to the first fractal map, wherein for the first grid defined region, the history level is changed to a first history level that displays a background color of the context panes of each of the plurality of grid defined regions of the second fractal map in the navigation pane of the first grid defined region of the first fractal map.

It should be appreciated that the steps shown in FIG. 11 are merely illustrative and that additional steps may be added, and the steps may be omitted or rearranged in order.

As noted, aspects of the embodiments discussed herein may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 818 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the FIGS. illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Method steps described herein may be tied, for example, to a general purpose computer programmed to carry out such steps, or to hardware for carrying out such steps, as described herein. Further, method steps described herein, including, for example, obtaining data streams and encoding the streams, may also be tied to physical sensors, such as cameras or microphones, from whence the data streams are obtained.

It should be noted that any of the methods described herein can include an additional step of providing a system comprising distinct software modules embodied on a computer readable storage medium. The method steps can then be carried out using the distinct software modules and/or sub-modules of the system, as described above. In some cases, specialized hardware may be employed to implement one or more of the functions described here. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for managing web navigation, comprising:
generating a plurality of fractal maps in response to user navigation inputs, each fractal map comprising a plurality of grid defined regions each comprising a context pane and a navigation pane, and wherein each context pane is associated with a hierarchal level and each navigation pane is associated with a history level that is recursively dependent on the hierarchal level;
displaying a first fractal map in response to a first user navigation input, wherein for a first grid defined region of the plurality of grid defined regions, the hierarchal level is a first hierarchal level and the history level is a null history level;
receiving user selection of the navigation pane of the first grid defined region in the first fractal map;
displaying a second fractal map based on user selection of the navigation pane of the first grid defined region, wherein for each the plurality of grid defined regions in the second fractal map, the hierarchal level is a second hierarchal level;

receiving user input to navigate back to the first fractal map; and displaying an updated version of the first fractal map in response to the received user input to navigate back to the first fractal map, wherein for the first grid defined region, the history level is changed to a first history level that displays a background color of the context panes of each of the plurality of grid defined regions of the second fractal map in the navigation pane of the first grid defined region of the first fractal map.

2. The method of claim 1, wherein the second hierarchal level is a descendant of the first hierarchal level.

3. The method of claim 1, wherein the first history level corresponds to the second hierarchal level.

4. The method of claim 1, further comprising:

receiving user selection of the navigation pane of a second grid defined region in the second fractal map; and displaying a third fractal map based on user selection of the navigation pane of the second grid defined region, wherein for each of the plurality of grid defined regions in the second fractal map, the hierarchal level is a third hierarchal level representative of a descendant of the second hierarchal level.

5. The method of claim 4, further comprising:

receiving user input to navigate back to the second fractal map; and displaying an updated version of the second fractal map in response to the received user input to navigate back to the second fractal map, wherein for the second grid defined region, the history level is changed to a history level commensurate with the third hierarchal level that displays the context panes of each of the plurality of grid defined regions of the third fractal map in the navigation pane of the second grid defined region of the second fractal map.

6. The method of claim 5, further comprising:

receiving user input to navigate back to the first fractal map after having previously navigated to the third fractal map; and displaying another updated version of the first fractal map in response to the received user input to navigate back to the first fractal map, wherein for the first grid defined region, the history level is changed to a history level commensurate with the second and third hierarchal levels such that the navigation pane of the first grid defined region of the first fractal map shows the third fractal map nested within the second grid defined region of the second fractal map.

7. The method of claim 1, wherein the generating comprises:

calculating a shade of color for each context pane.

8. The method of claim 7, wherein the shades of color for each context pane are calculated to provide a visual representation of relative similarity to each other.

9. The method of claim 7, wherein the calculated shade of color for each context pane is displayed as the background color.

10. A method for managing asset access, comprising:

accessing a data source to obtain assets to be displayed on a screen;

receiving user inputs to view assets obtained from the data source;

displaying fractal maps that are generated in response to the received user inputs, wherein each fractal maps comprises a plurality of quadrants, and wherein each quadrant comprises:

a metadata pane that provides contextual information related to a particular one of the obtained assets; and a history pane that includes a recursively generated fractal map depicting a plurality of sub-quadrants representative of assets that are related descendants of the particular one of the obtained assets; and recursively generating the recursively generated fractal map in response to the received user inputs, wherein the recursively generating the recursively generated fractal map comprises:

displaying a first fractal map;

receiving a first user input;

displaying a second fractal map in response to the received first user input;

storing a representation of the second fractal map for subsequent display in the plurality of sub-quadrants;

receiving a second user input;

displaying a third fractal map in response to the received first user input;

storing a representation of the third fractal map for subsequent display in the plurality of sub-quadrants;

receiving a user input to navigate back to the first fractal map; and displaying the first fractal map in response to the received user input to navigate back to the first fractal map, the first fractal map comprising the stored representations of the second and third fractal maps, wherein the representation of the third fractal map is nested within a sub-quadrant of the representation of the second fractal map.

11. The method of claim 10, further comprising:

calculating a shade of color for each metadata pane; and displaying the calculated shade of color as a background color in each metadata pane.

12. The method of claim 11, further comprising:

calculating a shade of color for each of the plurality of sub-quadrants representative of assets displayed in the history pane; and displaying the calculated shade of color for each of plurality of sub-quadrants representative of assets displayed in the history pane.

13. The method of claim 12, wherein the shades of color for each metadata pane and for each of the plurality of sub-quadrants representative of assets are calculated to provide a visual representation of relative similarity to each other.

14. The method of claim 13, wherein shades of a common color are indicative of assets are relatively more closely related and wherein shades of different colors are indicative of assets that are relatively less closely related.

15. The method of claim 10, wherein the recursively generating the recursively generated fractal map comprises:

displaying a first fractal map;

receiving a first user input;

displaying a second fractal map in response to the received first user input;

storing a representation of the second fractal map for subsequent display in the plurality of sub-quadrants;

receiving a user input to navigate back to the first fractal map; and displaying the first fractal map in response to the received user input to navigate back to the first fractal map, the first fractal map comprising the stored representation of the second fractal map.

* * * * *